US012154231B2

(12) United States Patent
Banerjee et al.

(10) Patent No.: US 12,154,231 B2
(45) Date of Patent: Nov. 26, 2024

(54) LATE STAGE OCCLUSION BASED RENDERING FOR EXTENDED REALITY (XR)

(71) Applicant: QUALCOMM Incorporated, San Diego, CA (US)

(72) Inventors: Sudipto Banerjee, Bangalore (IN); Vinay Melkote Krishnaprasad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/813,900

(22) Filed: Jul. 20, 2022

(65) Prior Publication Data

US 2024/0029363 A1     Jan. 25, 2024

(51) Int. Cl.
*G06T 19/00*     (2011.01)
*G06T 15/00*     (2011.01)

(52) U.S. Cl.
CPC ............ *G06T 19/006* (2013.01); *G06T 15/00* (2013.01); *G06T 2215/16* (2013.01)

(58) Field of Classification Search
CPC .... G06T 19/006; G06T 15/00; G06T 2215/16
See application file for complete search history.

(56) References Cited

U.S. PATENT DOCUMENTS 11,373,339 B2 *  6/2022  Graziosi ............... G06T 17/205
11,402,634 B2 *  8/2022  Goodman ........... A63F 13/5258

(Continued)

FOREIGN PATENT DOCUMENTS

WO     WO-2021226535 A1 *  11/2021  ............ G02B 27/00
WO        2021247171 A1      12/2021

OTHER PUBLICATIONS

Du C., et al., "Edge Snapping-Based Depth Enhancement for Dynamic Occlusion Handling in Augmented Reality", 2016 IEEE International Symposium on Mixed and Augmented Reality (ISMAR), IEEE, Sep. 19, 2016, pp. 54-62, XP033023367, DOI: 10.11 09/ISMAR. 2016.17, abstract, Section 1 "Introduction", Section 2 "Related work", Section 3 "System and algorithm", figures 1, 3, 4,5, 6, 7, 11, 12, 13, 14.

(Continued)

*Primary Examiner* — Abderrahim Merouan
(74) *Attorney, Agent, or Firm* — Patterson + Sheridan, L.L.P.\Qualcomm

(57) ABSTRACT

Certain aspects of the present disclosure present a method of graphics processing at a wearable display device. The method generally includes rendering a first image based on a position of the wearable display device and contours and depth information for one or more real-world objects associated with the position, the rendered first image comprising, at least, one or more virtual objects, re-projecting the first image based on an updated position of the wearable display device that is different than the position, rendering a second image using re-projected contours of the one or more real-world objects in the first image, updated depth information for the one or more real-world objects in the first image, updated depth information for the one or more virtual objects in the first image, and warped one or more virtual objects, and displaying the second image on a display of the wearable display device.

28 Claims, 15 Drawing Sheets

(56) References Cited

U.S. PATENT DOCUMENTS

| | | |
|---|---|---|
| 2009/0195641 A1 | 8/2009 | Neuman |
| 2013/0293531 A1 | 11/2013 | Cao et al. |
| 2017/0278304 A1* | 9/2017 | Hildreth .............. G06F 3/04815 |
| 2018/0276824 A1* | 9/2018 | Haraden ................... G06T 3/20 |
| 2019/0197765 A1* | 6/2019 | Molyneaux ............... G06T 7/50 |
| 2020/0410753 A1* | 12/2020 | Molyneaux ........... G06T 19/006 |
| 2021/0004630 A1* | 1/2021 | Uscinski ............... G06T 19/006 |
| 2022/0114788 A1* | 4/2022 | Molyneaux ............. G06F 3/017 |
| 2022/0206298 A1* | 6/2022 | Goodman ............... G06F 3/011 |

OTHER PUBLICATIONS

International Search Report and Written Opinion—PCT/US2023/067429—ISA/EPO—Sep. 8, 2023.

* cited by examiner

LATE STAGE OCCLUSION BASED RENDERING FOR EXTENDED REALITY (XR)

BACKGROUND

Field of the Disclosure

Aspects of the present disclosure relate to techniques for graphics processing.

Description of Related Art

Extended Reality (XR) refers to real-and-virtual environments generated by computer graphics. XR is the umbrella category that covers various forms of computer-altered reality, including: augmented reality (AR), mixed reality (MR), and virtual reality (VR). VR technology exists for simulating virtual environments within which a user may be immersed. VR technology generally uses a headset, blocking out visual stimulus from the real world. AR technology allows users to see the real world, but overlays virtual elements. In particular, AR displays are those in which the image is of a primarily real environment, which is enhanced, or augmented, with computer-generated imagery. MR technology allows real and virtual objects to interact with one another and a user of the MR technology to interact with virtual elements like they would in the real world.

With AR, an image of a virtual object and a real world scene are combined so as to generate an augmented reality image in which it appears to the viewer that the virtual object has been included in the real world scene. The augmented reality image may be generated by rendering the virtual object within a portion of the captured real world scene. When rendering the virtual object in the scene, the relative depth of the virtual object with respect to the depth of the scene is considered to ensure that portions of the virtual object and/or the real world scene are correctly occluded with respect to one another. By occluding the images in this way, a realistic portrayal of the virtual object within the scene can be achieved.

Determining the correct occlusion in an AR image may be performed by comparing corresponding depth values for (1) an image of the virtual object to be placed in the real world scene and (2) the real world scene itself. Based on such comparison, the virtual object and the real world scene may be combined by rendering for each pixel of a display, either a pixel from the image of the virtual object or a pixel for the real world scene based upon which of the virtual object or real world object corresponding to the pixel location has a smaller depth value with respect to a specified viewpoint. Such comparison and rendering may be performed for each pixel to create an image augmented with virtual objects.

Accordingly, the quality of occlusion handling may depend upon the quality of depth estimates for real and virtual objects (e.g., low quality depth estimates of real and virtual objects may cause improper blending between object boundaries). The quality of occlusion handling may also be impacted by a latency between a time that a virtual object is rendered and a time that the virtual object is displayed (e.g., Motion2Render2PhotonLatency). For example, higher latency between render and display may cause gaps and/or improper overlay between real and virtual objects.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In certain aspects, a method of graphics processing at a wearable display device is disclosed. The method includes rendering a first image based on a position of the wearable display device and contours and depth information for one or more real-world objects associated with the position, the rendered first image comprising, at least, one or more virtual objects, re-projecting the first image based on an updated position of the wearable display device that is different than the position, wherein the re-projecting comprises: re-projecting contours of the one or more real-world objects based on the updated position, updating depth information for the one or more real-world objects based on the updated position, updating depth information for the one or more virtual objects in the first image based on the updated position, and warping the one or more virtual objects in the first image based on the updated position, rendering a second image using the re-projected contours of the one or more real-world objects, the updated depth information for the one or more real-world objects, the updated depth information for the one or more virtual objects, and the warped one or more virtual objects, and displaying the second image on a display of the wearable display device.

Other aspects provide: an apparatus operable, configured, or otherwise adapted to perform the aforementioned method and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

BRIEF DESCRIPTION OF THE DRAWINGS

The following description and the appended figures set forth certain features for purposes of illustration.

DETAILED DESCRIPTION

Figure 1:
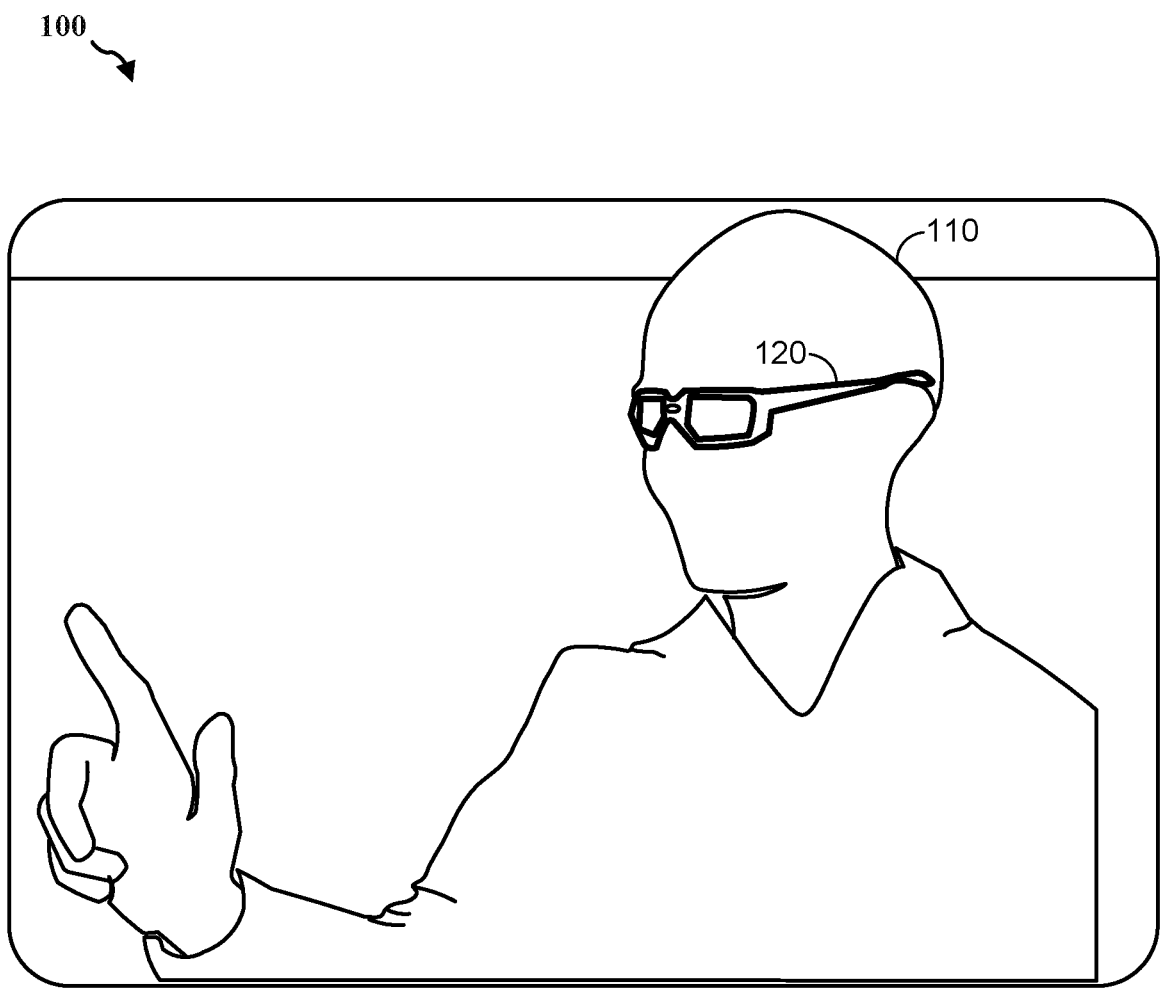
FIG. 1 is a simplified illustration of an example of a wearable display device worn on a head of a user, in accordance with certain aspects of the present disclosure.

The present disclosure provides techniques for graphics processing, and more specifically, techniques for late stage occlusion rendering in extended reality (XR) systems.

For example, optical see-through (OST) AR is an example of XR in which virtual content, such as computer graphics, text, or video, is presented to a user (e.g., of an OST display device) via a transparent optical system through which the real world remains visible. On the other hand, video see-through (VST) MR is an example of XR in which virtual content and real images are merged and displayed to a user (e.g., of a VST display device). In either system (e.g., AR or MR), when rendering virtual content in the real-world scene (e.g., performing graphics processing), the relative depth of the virtual content with respect to the depth of real-world objects in the scene may be considered to ensure that the virtual content is correctly occluded with respect to real-world objects in the scene. By occluding the virtual content in this way, a realistic portrayal of the virtual content within the scene can be achieved.

In some cases, such graphics processing for XR systems is performed at a computing system, such as a computing system integrated into and/or communicatively coupled with an OST (e.g., in AR), a VST (e.g., in MR) device (referred to herein as a wearable display device), and/or the like. In some cases, such graphics processing may be distributed between the computing system and a render server communicatively coupled to the computing system, such as using a wired or wireless communication (e.g., over a network). While utilizing split rendering may help to offload portions of graphics processing performed at the computing system, split rendering may result in increased latency (e.g., due to latency in processing, network jitter, and/or network irregularities when communicating a rendered image from the render server to the computing system of the wearable display device).

With rendering latency, the real-world scene may change between a time when the real-world scene is first captured and used to render virtual objects, and when the rendered virtual objects are displayed as augmented objects in the real-world scene. For example, in certain aspects, the real-world scene may be updated (e.g., between these two times) due to a changing position of the wearable display device (e.g., due to head movement of a user of the wearable display device), even where objects in the real-world scene remain stationary. In certain aspects, the real-world scene may be updated due to one or more moving real-world objects in the real-world scene, while the wearable display device remains in a constant position. In certain aspects, the real-world scene may be updated due to both a changing position of the wearable display device and one or more moving real-world objects in the real-world scene. Accordingly, when the virtual objects are displayed as augmented objects in the updated real-world scene on a display of the wearable display device, the rendered virtual objects may not properly align with real-world objects in the updated scene. Thus, a user viewing the displayed image may see gaps between virtual and real-world objects and/or improper overlay of virtual and real-world objects in the real-world scene displayed for the user.

Accordingly, aspects of the present disclosure provide techniques for late stage occlusion rendering in XR applications. Late stage occlusion rendering techniques described herein may be used to re-project depth information for real-world objects in addition to virtual objects in a rendered image due to a change in the real-world objects displayed at the wearable display device (e.g., due to a change in position of the wearable display device and/or a change in position of the real-world objects) after an image has been rendered. The re-projected real and virtual depths may be used to perform occlusion rendering when modifying the previously rendered image. Further, in certain aspects, contours of the real-world objects may also be re-projected based on the re-projected depths for improved occlusion at the updated position.

Re-projection of the real-world objects (e.g., updating depth information for the real-world objects and re-projecting contours of the real-world objects) may allow for more accurate depth and contour information of the real-world objects when performing occlusion prior to display of the image. As such, the techniques present herein may help to ensure that virtual content and/or the real-world scene are correctly occluded with respect to one another (even in cases of high latency due to the implementation of split rendering techniques). Therefore, a more realistic portrayal of virtual objects within the real-world scene may be achieved.

Various aspects of systems, apparatuses, computer program products, and methods are described more fully hereinafter for image processing. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different graphics technologies, system configurations, etc., some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs, central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a simplified illustration 100 of an example of a wearable display device 120 worn on a head of a user 110 that can be used with or can implement one or more of the aspects described herein. The wearable display device 120 includes a body or frame, similar to a pair of glasses, which can rest on the nose and ears of a user. Portions of the display of the wearable display device 120 can be positioned in front of a user's eyes like lenses of a pair of glasses. In some aspects, the display is opaque (e.g., for MR). In some aspects, at least a portion of the display can be transparent (e.g., for AR), such that within the user's field of view the user 110 can see both the user's surroundings and images (e.g., data elements) shown with the display. The level of transparency of the images shown on the display may vary, depending on the desired functionality of the display, settings of a graphical user interface (GUI) shown with the display, and/or a software application executed by the wearable display device 120 (e.g., a video, a map, an Internet browser, etc.).

Furthermore, wearable display device 120 may include interfaces such as speakers (and/or headphones), a touchpad, buttons, and the like to interact with the user 110. In another aspect, wearable display device 120 may include a wireless interface for connecting with the Internet, a local wireless network, or another computing device. Wearable display device 120 may also be operable to receive audio and/or gestural inputs from a user. Such gestural or audio inputs may be spoken voice commands or a recognized user gesture, which when recognized by a computing device may cause that device to execute a corresponding command. Gestures may be received from one or more motion sensors and/or cameras integrated into and/or communicatively coupled with wearable display device 120 to allow the wearable display device to track one or more objects, such as a user's hand(s), and determine whether the object(s) has made a gesture. Furthermore, in certain aspects wearable display device 120 may include camera(s) and/or other sensors to determine the gaze of a user (e.g., where a user is looking). This eye-tracking functionality can be incorporated into gestures and/or other user inputs.

Furthermore, wearable display device 120 can include and/or be communicatively coupled with motion sensors, such as one or more accelerometer(s), magnetometer(s), gyroscopes, Global Positioning System (GPS) receiver(s) (and/or other Satellite Positioning System (SPS) receiver(s)), altimeter(s), cameras, infrared sensors, etc., to sense the position (e.g., movement and/or orientation) of user 110 and/or the user's head. A determination of the user's field of view, for purposes of displaying images as described herein, can be based on sensor information providing, for example, a detected head orientation/direction of travel of the user. A direction of travel can be determined by, for example, a compass (e.g., a magnetometer) and/or a plurality of positioning measurements (e.g., SPS location measurements). Elevation and/or context data may be used to determine whether a user is looking down or up because a pathway is slanted. For instance, data from the gyroscope may be compared to elevation data to determine whether the head is tilted in a direction in which a path on which the user is located is tilted.

Figure 2A:
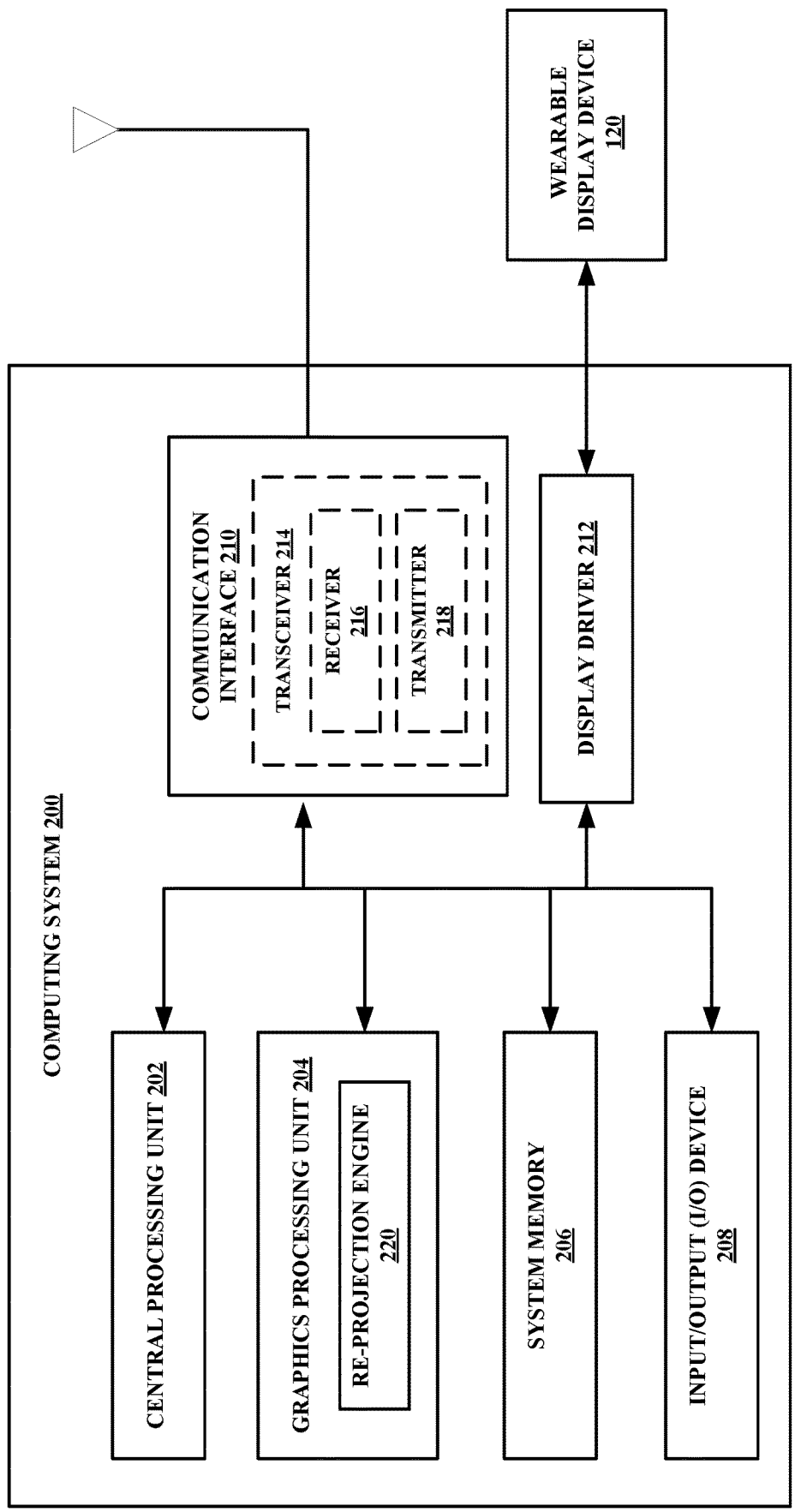
FIGS. 2A and 2B are block diagrams illustrating example rendering and display systems configured to implement one or more aspects of the present disclosure.
Figure 2B:
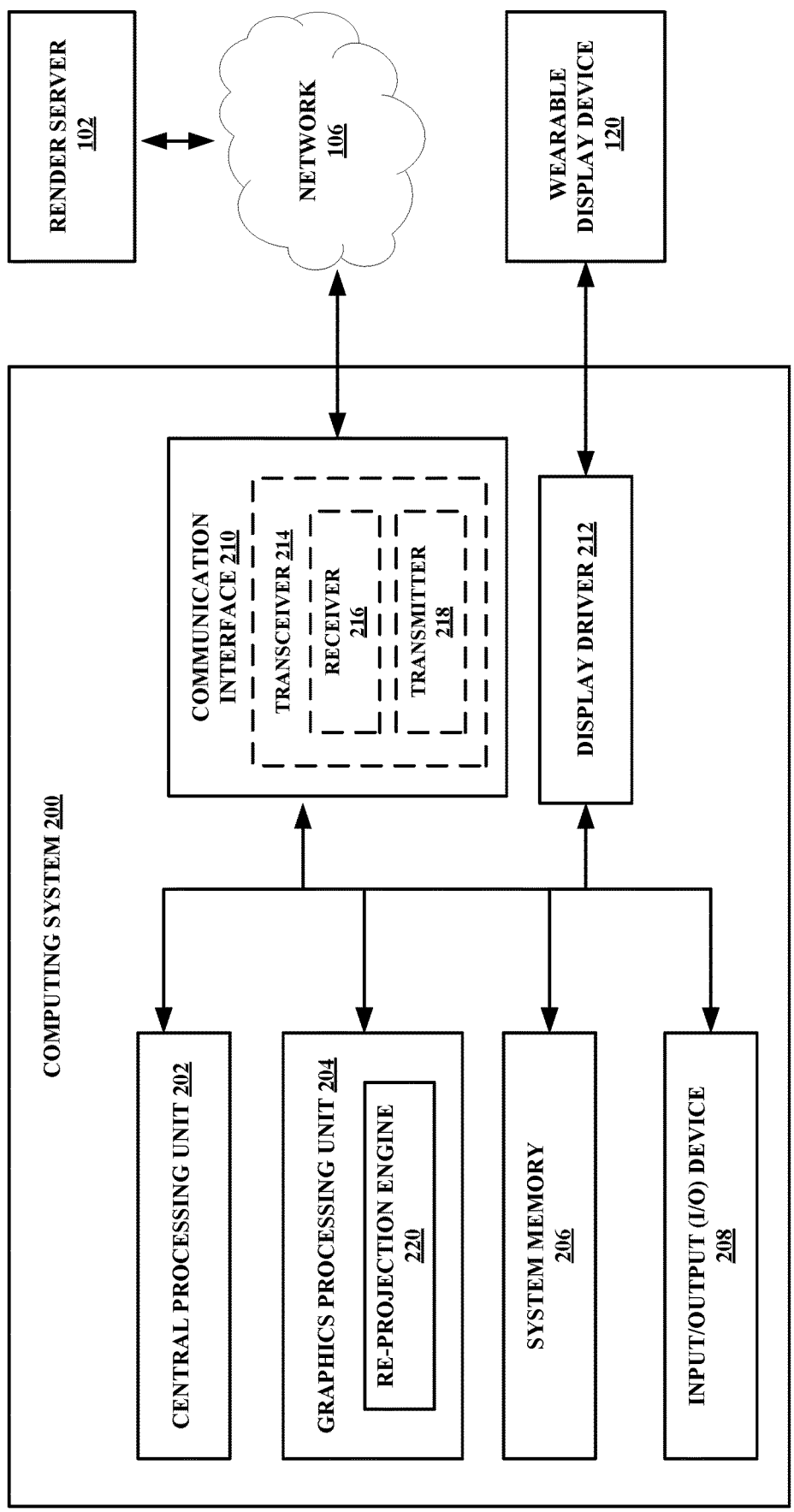

A computing system, such as computing system 200 of FIGS. 2A and 2B, may be integrated into and/or communicatively coupled (wired or wirelessly) with wearable display device 120. Accordingly, wearable display device 120 can execute software applications such as games, maps, videos, and/or other applications described herein that generate images that are displayed on wearable display device 120. Additionally or alternatively, in certain aspects, wearable display device 120 can display software applications executed by one or more devices communicatively coupled with wearable display device 120 via, for example, wireless device-to-device protocol (e.g., BLUETOOTH or WI-FI DIRECT) and/or via a network (e.g., a WIFI network). For instance, wearable display device 120 may be communicatively coupled with one or more mobile devices such as a mobile phone, personal media player, game system, and/or other device, and display information from the mobile device.

One or more components of computing system 200 could be shared between different devices, such as a wearable display device, smart phone, tablet, personal computer, or other computing device. In some embodiments, software and other applications could be run on a separate device communicatively linked to wearable display device 120. In other embodiments, wearable display device 120 may have some or all of computing system 200 integrated therewith.

Computing system 200 may include one or more components and/or circuits for performing various functions described herein. In some examples, one or more components of computing system 200 may be components of a system on a chip (SOC) or integrated circuit (IC). In the example shown in FIGS. 2A and 2B, computing system 200 includes one or more central processing units (CPUs) 202, one or more graphical processing units (GPUs) 204, a system memory 206, one or more input/output (I/O) devices 208, a communication interface 210, and a display driver 212. In certain aspects, communication interface 210 includes a transceiver 214 (e.g., including a receiver 216 and a transmitter 218) to permit communication with a server (via a network, as described with respect to FIG. 3), a network, other computer systems, and/or any other electrical devices/peripherals. In certain aspects GPU 204 includes a re-projection engine 220 (described in more detail below).

In certain aspects, the components of computing system 200 are communicatively connected to one another by one or more buses 150. It should be noted that though certain connections are shown between components in FIG. 1, the connections between components may be different than shown. For example, all components may be coupled to a shared bus 150, different components may be coupled to different buses, etc.

Display driver 240 is configured to drive a display on wearable display device 120. In particular, GPU 204 may be configured to perform graphics processing. Display driver 240 may be configured to drive the presentation of frames processed by GPU 204 and/or CPU 202 on wearable display device 120. In some examples, display(s) at wearable display device 120 include one or more of: a liquid crystal display (LCD), a plasma display, an organic light emitting diode (OLED) display, a projection display device, a VR/AR/MR display device, a head-mounted display, or any other type of display device. When discussing displaying images on the wearable display device 120, such displaying refers to displaying the images on the display of the wearable display device 120. In certain aspects, display driver 240 is configured to drive a visual representation of virtual and real-world objects.

Memory external to the GPU 204 and the CPU 202, such as system memory 206 (described in more detail below), may be accessible to the GPU 204 and the CPU 202. For example, GPU 204 and CPU 202 may be configured to read from and/or write to external memory, such as the system memory 206. GPU 204 and CPU 202 may be communicatively coupled to system memory 206 over a bus. In some examples, GPU 204 and CPU 202 may be communicatively coupled to each other over the bus or a different connection.

GPU 204 may be a general purpose GPU, or any other processing unit that may be configured to perform graphics processing. In some examples, GPU 204 may be integrated into a motherboard. In some examples, GPU 204 may be present on a graphics card that is installed in a port in a motherboard, or may be otherwise incorporated within a peripheral device configured to interoperate with computing system 200. GPU 204 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, GPU 204 may store instructions for the software in a suitable, non-transitory computer-readable storage medium, e.g., system memory 206, and may execute the instructions in hardware using one or more processors to perform the techniques of this disclosure. Any of the foregoing, including hardware, software, a combination of hardware and software, etc., may be considered to be one or more processors.

CPU 202 may be any processing unit configured to send instructions to GPU 204 and perform general computational processing (e.g., non-graphical processing). In some examples, CPU 202 may be integrated into a motherboard. CPU 202 may include one or more processors, such as one or more microprocessors, ASICs, FPGAs, ALUs, DSPs, video processors, discrete logic, software, hardware, firmware, other equivalent integrated or discrete logic circuitry, or any combinations thereof. If the techniques are implemented partially in software, CPU 202 may store instructions for the software in a suitable, non-transitory computer-readable storage medium, e.g., system memory 206, and may execute the instructions in hardware using one or more processors to perform the techniques of this disclosure. Any of the foregoing, including hardware, software, a combination of hardware and software, etc., may be considered to be one or more processors.

In certain aspects, CPU 202 and/or GPU 204 are configured to perform graphics processing. In particular, CPU 202 and/or GPU 204 may be configured to render an image on a display of wearable display device 120. For example, CPU 202 may determine a position (e.g., three degrees of freedom (3 DoF) pose data, 6 DoF pose data, etc.) of wearable display device 120 and generate an application command, for GPU 204 to render an image based on the position information. For example, the command may instruct GPU 204 to render a scene, such as for an executing application. In certain aspects, the command may instruct GPU 204 to render an image having both virtual and real objects.

In certain aspects, the command may instruct GPU 204 to render an image having both virtual and real objects using occlusion based rendering techniques. Occlusion based rendering techniques involve identifying portions of a virtual object that should not be rendered and/or displayed to a user because the presence of an object in the physical world prevents the user from viewing the location at which the virtual object will be perceived by the user. Proper occlusion based rendering techniques may be important to achieve realism in AR and MR applications.

Figure 3A:
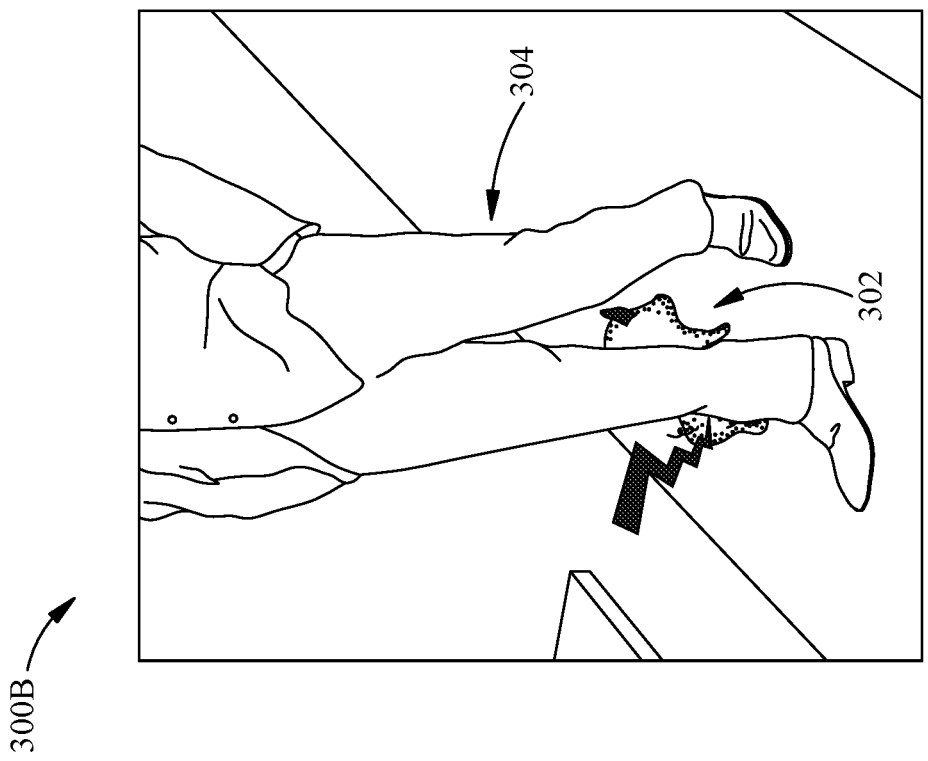
FIG. 3A illustrates an example augmented reality (AR) image generated without using occlusion techniques, in accordance with certain aspects of the present disclosure.
Figure 3B:
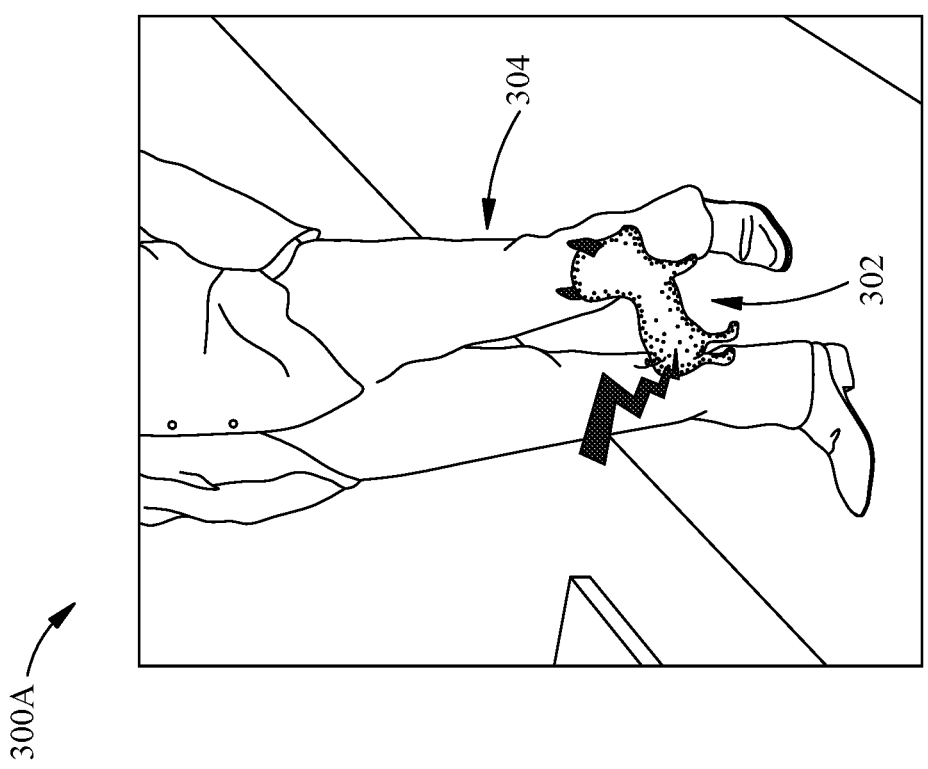
FIG. 3B illustrates an example AR image generated using occlusion techniques, in accordance with certain aspects of the present disclosure.

For example, FIG. 3A illustrates an example AR image 300A generated without using occlusion techniques, while FIG. 3B illustrates an example AR image 300B generated using occlusion techniques, in accordance with certain aspects of the present disclosure.

In FIGS. 3A and 3B, GPU 204 may receive a command, from CPU 202, to render an image having a virtual dog object 302 placed in a real world scene. In cases where occlusion based rendering techniques are not used, as shown in FIG. 3A, virtual dog object 302 may be placed as an overlay in the real-world scene, such that it appears as if virtual dog object 302 is "pasted" on person 304 in the real-world scene. This breaks the natural perception and provides for a less immersive experience for a user of a wearable display device displaying the rendering image.

On the other hand, in cases where occlusion based rendering techniques are used, as shown in FIG. 3B, virtual dog object 302 may be placed in the real-world scene following physical laws of light and depth. More specifically, because virtual dog object 302 (e.g., pixels of virtual dog object 302) corresponds to a depth greater than a depth of person 304 (e.g., a depth of each pixel of person 304), virtual dog object 302 may be placed behind person 304 in the rendered image. In other words, virtual dog object 302 may be occluded by person 304 in the real-world scene thereby providing more seamless interactions between real and virtual objects in the rendered image.

In certain aspects, GPU 204 is configured to perform time warping techniques as part of the graphics processing. Time warping an image, refers to changing a rendered image to be displayed on wearable display device 120 due to a changed position of wearable display device 120 after the image has already been rendered, such as by GPU 204. For example, GPU 204 may render images based on a position of wearable display device 120. Such position information, however, is determined at some time interval before GPU 204 actually renders the image (e.g., due to latency in CPU, GPU, etc. processing and memory reads and writes). Accordingly, the position of the wearable display device 120 may further change between when the position is initially determined, when the image is rendered, and further when the rendered image is displayed on a display of wearable display device 120. Therefore, after the image is rendered and before the image is displayed on wearable display device 120, time warping may be applied to the rendered image, which modifies the rendered image based on updated position information for wearable display device 120.

For example, at a first time, a user may be looking in a first direction. CPU 202 may determine a position of wearable display device 120, while the user is looking in the first direction, and request GPU 204 to render an image based on this position information. GPU 204 may generate a rendered image based on this position information. However, the position of the user's eye(s) or head may have changed from the time of the request (e.g., the first time) to the present time (e.g., a second time). At the second time, the user may be looking in a second direction. Accordingly, GPU 204 may warp the rendered image to account for such change in the position of wearable display device 120, and in some cases, a change in a position of a user's eyes from the first time to the second time.

In certain aspects, GPU 204 is configured to perform lens warping techniques. Lens warping an image refers to changing the rendered image to be displayed on wearable display device 120 to correct for any distortion introduced by lenses in wearable display device 120.

In certain aspects, GPU 204 includes a re-projection engine 220. Re-projection engine 220 may be configured to perform graphical adjustments to a rendered image based on later stage position information associated with wearable display device 120 (e.g., a pose of wearable display device 120 when the image is to be displayed, referred to herein as the display pose). The later stage position information may be updated 3 DoF pose data, 6 DoF pose data, etc. for wearable display device 120. In certain aspects, such graphical adjustments include re-projecting contours of real-world objects based on the later stage position information. In certain aspects, such graphical adjustments include updating depth information for the real-world objects based on the later stage position information. In certain aspects, such graphical adjustments include updating depth information for virtual objects in the rendered image based on the later stage position information. In certain aspects, such graphical adjustments include warping (e.g., time warping) the virtual objects in the rendered image based on the later stage position information. In certain aspects, such graphical adjustments include re-projecting contours of the virtual objects in the rendered image based on the later stage position information.

Further, re-projection engine 220 may be configured to perform occlusion rendering subsequent to performing such graphical adjustments. For example, re-projection engine 220 may use the re-projected contours of the real-world objects, the updated depth information for the real-world objects, the updated depth information for the virtual objects, the warped virtual objects, and/or the re-projected contours of the real-world objects to render a second image for display. A virtual object (e.g., a portion or all of the virtual object) may be hidden (e.g., occluded) in the rendered second image by a real-world object where updated depth information for the virtual object indicates that the virtual object is behind (e.g., further away than) a real-world object (e.g., based on the updated depth information for the real-world object) at the later stage position. A virtual object (e.g., a portion or all of the virtual object) may not be occluded in the rendered second image where updated depth information for the virtual object indicates that the virtual object is in front of (e.g., closer than) a real-world object (e.g., based on the updated depth information for the real-world object) at the later stage position. Techniques performed by re-projection engine 220 are described in more detail below with respect to FIGS. 7, 9, 11, 12, and 13.

Referring back to FIGS. 2A and 2B, system memory 206 may include one or more volatile or non-volatile memories or storage devices. In some examples, system memory 206 may include random access memory (RAM), static RAM (SRAM), dynamic RAM (DRAM), erasable programmable ROM (EPROM), EEPROM, flash memory, a magnetic data media or an optical storage media, or any other type of memory.

System memory 206 may be a non-transitory storage medium according to some examples. The term "non-transitory" may indicate that the storage medium is not embodied in a carrier wave or a propagated signal. However, the term "non-transitory" should not be interpreted to mean that system memory 206 is non-movable or that its contents are static. As one example, system memory 206 may be removed from a device where computing system 200 is integrated and moved to another device. As another example, system memory 206 may not be removable from a device where computing system 200 is integrated.

One or more I/O devices 208 may include, without limitation, one or more GPS receivers (and or receivers from any other Satellite Positioning System (SPS)), accelerometers, gyroscopes, magnetometers (and/or other orientation sensors), altimeters, cameras, and/or other sensors to be able to detect location, motion, orientation, light, sound, and the like, which can be utilized as means for gathering position, movement, and other data. Moreover, sensors may be utilized, together CPU 202, as means for detecting the movement of wearable display device 120 on a user's head, as described herein. Other devices such as a touch pad, keyboard, microphone, and/or the like may also be included. One or more displays and/or other display means, as well as speakers and/or other devices, may also be included.

As mentioned, communication interface 210 may include a receiver 216 and a transmitter 218. Receiver 216 may be configured to perform any receiving function described herein with respect to computing system 200. Additionally, receiver 216 may be configured to receive information from another device or server. Transmitter 218 may be configured to perform any transmitting function described herein with respect to computing system 200. For example, transmitter 218 may be configured to transmit information to another device or server. Receiver 216 and transmitter 218 may be combined into a transceiver 214. In such examples, transceiver 214 may be configured to perform any receiving function and/or transmitting function described herein with respect to computing system 200.

In certain aspects, communication interface 210 may be configured to communicate with a server over a network, and more specifically, as shown in FIG. 2B, communication interface 210 may be configured to communicate with a render server 102 over network 106. For example, in certain aspects, the rendering of an image or frame may be performed in multiple locations and/or on multiple devices, e.g., in order to divide the rendering workload between different devices. The rendering workload may be split between render server 102 and computing system 200 (e.g., integrated into and/or communicatively coupled with wearable display device 120). This process can be referred to as "split rendering."

Render server 102 may be any device capable of performing graphics processing offloaded from computing system 200. For example, render server 102 may be a cloud server, an edge server, a personal computer, a smart phone, or any appropriate device. Split rendering may distribute the rendering graphics processing between render server 102 and computing system 200 in a number of different ways (e.g., 70% of processing at render server 102 and 30% of processing at computing system 200, 50% of processing at render server 102 and 50% of processing at computing system 200, etc.).

In certain aspects, split rendering is a method for providing content (e.g., virtual content) to wearable display device 120 for display, where a portion of the computer or graphics processing to render such content is performed outside of computing system 200, e.g., at render server 102. The content may be rendered on render server 102, and then encoded and transmitted to computing system 200. Computing system 200 may then decode the content and re-project and warp the content to a latest user position (e.g., pose), as well as display the content at wearable display device 120 via display driver 212 on computing system 200.

According to aspects described herein, computing system 200 may also re-project depth information for real-world objects, re-project contours for the real-world objects, and/or warp real-world objects (e.g., in MR systems) to help in accurately displaying the content at wearable display device 120. For example, while split rendering may help to offload portions of graphics processing performed at computing system 200 to render server 102, split rendering may result in high latency, and more specifically, high motion-to-render-to-photon latency, or M2R2P latency. Latency is the difference between action and reaction. In XR, M2R2P latency refers to the delay between the movement of wearable display device 120 (e.g., the movement of the user's head) and the change of wearable display device 120's display reflecting the user's movement. In other words, M2R2P latency is the amount of time it takes (e.g., from the time the user's head moves/wearable display device 120 moves)), to render an image at render server 102, send the rendered image over network 106, and display the rendered image on wearable display device 120. The greater the delay (e.g., latency) between the physical movement and the display output, the more unrealistic the display of the virtual content seems. In some cases, the M2R2P latency may be even further increased due to frame repeats caused by network jitter, and/or network irregularities when communicating the rendered image from render server 102 to computing system 200 (e.g., of wearable display device 120).

For example, where there is high M2R2P latency due to split rendering, when a rendered image is to be displayed, real-world objects in the real-world scene may have moved (e.g., from the time the user's head moved to the time the rendered image is to be displayed). Thus, depth values and/or contours of real-world objects in the real-world scene which is to be augmented with virtual objects rendered by render server 102, may have changed. Accordingly, when occluding the virtual objects in the real-world scene, outdated depth values and contours of real-world objects may be used, thus resulting in poor occlusion handling. More specifically, gaps and/or improper overlay between real and virtual objects may result in an image displayed to the user due to inaccurate depth estimates and contours of real-world objects when performing occlusion.

Figure 4:
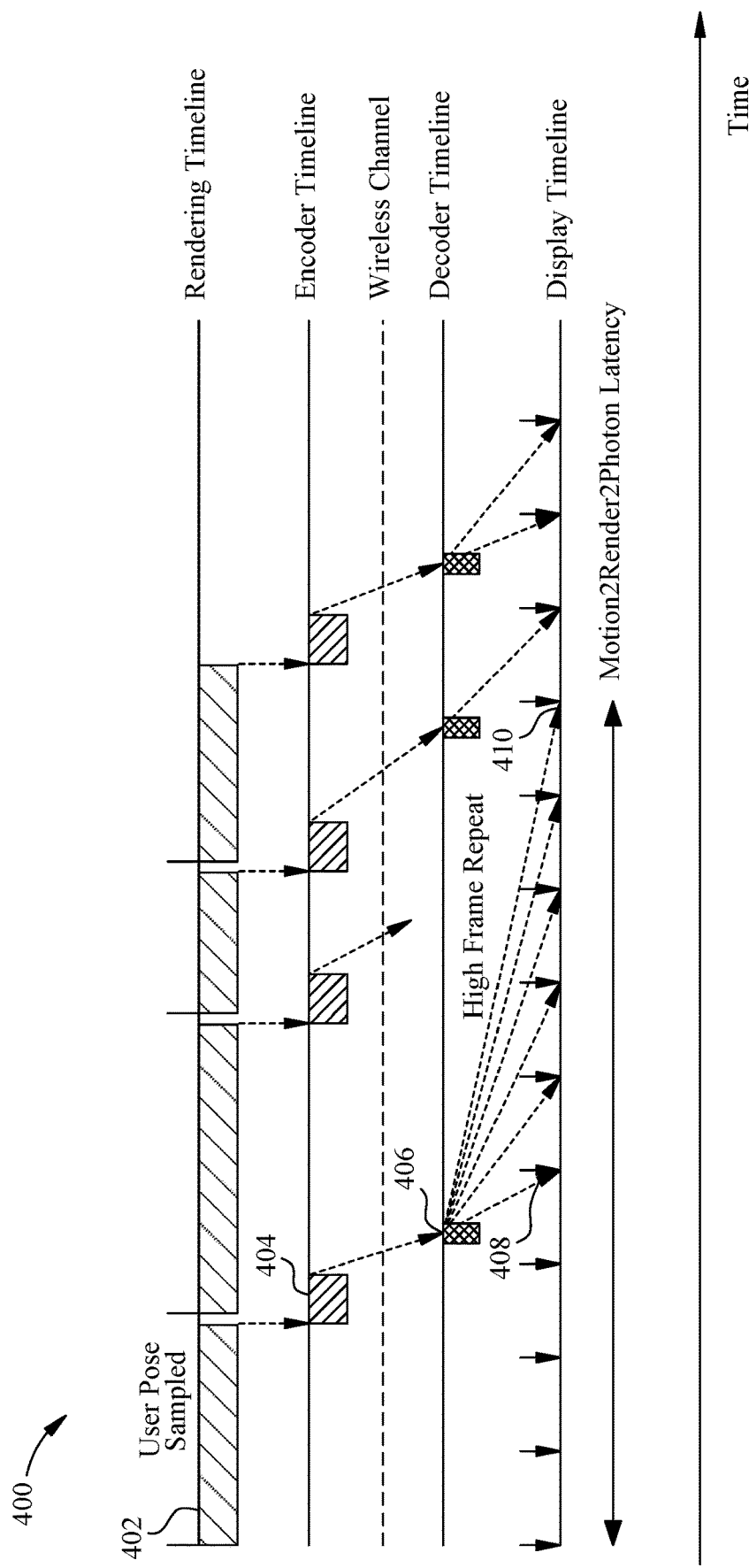
FIG. 4 is a timing diagram illustrating example latency resulting from split rendering, in accordance with certain aspects of the present disclosure.

FIG. 4 is a timing diagram 400 illustrating example M2R2P latency resulting from split rendering, in accordance with certain aspects of the present disclosure. As shown in timing diagram 400, at time 402, a position (e.g. pose) of wearable display device 120 is determined (e.g., user pose sampled). In certain aspects, I/O device(s) 208 on computing system 200 determine a position of wearable display device 120 and communicate this position to render server 102. Render server 102 renders a frame having virtual objects based on this position of wearable display device 120 and, at time 404 encodes the frame to be sent to computing system 200. At time 406, computing system 200 receives and decodes the frame from render server 102. The decoded frame may be displayed to a user of wearable display device 120 via display driver 212 at computing device 120. Time 408 represents the time where the frame is to be displayed to a user of wearable display device 120. However, a frame repeat may result due to jitter and/or irregularities in network 106. Thus, the frame may be displayed to a user at time 410, instead of time 408. Accordingly, such repeated frames may result in increased M2R2P latency. High M2R2P latency may cause a frame to be displayed to a user at a time when a position of wearable display device 120 has changed (and/or the real-world objects have changed since the original pose for rendering was determined). Thus, high M2R2P latency may result in degradation of an image displayed to a user of wearable display device 120.

Figure 5:
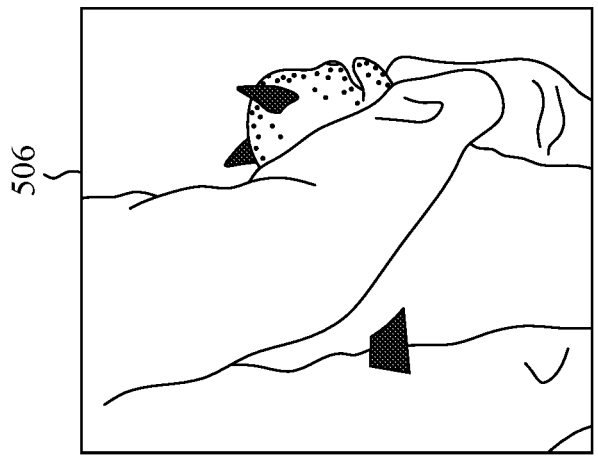
FIG. 5 illustrates example image degradation in high latency, split extended reality (XR) systems, in accordance with certain aspects of the present disclosure.
Figure 5:
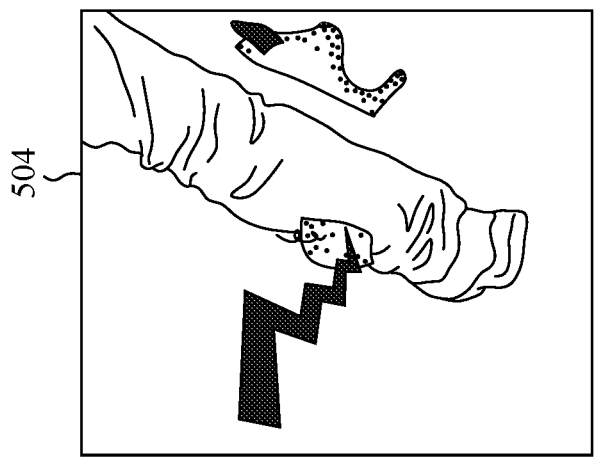
Figure 5:
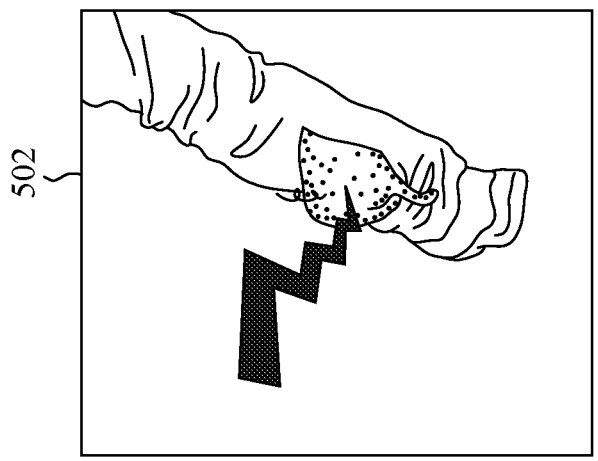

For example, FIG. 5 illustrates example image degradation in high latency, split XR systems, in accordance with certain aspects of the present disclosure. As shown in FIG. 5, example rendered images 502, 504, and 506 may include a virtual animal object placed in a real-world scene. However, due to high M2R2P latency, the real-world scene and the virtual animal object may not be aligned, thus resulting in (1) improper overlay between the virtual animal object and objects in the real world scene, as shown in rendered image 502, and/or (2) gaps between the virtual animal object and objects in the real world scene, as shown in rendered images 504 and 506. For example, in certain aspects, a position of wearable display device 120 when the virtual animal object in each of images 502, 504, and 506 is rendered may be different than a position of wearable display device 120 when the virtual animal object is presented in the real world scene for display to a user, thereby causing collisions and/or gaps between real world and virtual world objects (e.g., where such occlusion techniques are used). In certain aspects, a position of wearable display device 120 when the virtual animal object in each of images 502, 504, and 506 is rendered may be the same as a position of wearable display device when the virtual animal object is presented; however, real-world objects in the real-world scene may have moved from the time of rendering the virtual objects to the display of the virtual objects, thereby causing collisions and/or gaps between real world and virtual world objects Thus, techniques for mitigating M2R2P latency to provide more seamless occlusion between virtual and real objects displayed to a user are desired.

Example Late Stage Occlusion Rendering for Extended Reality (XR)

Aspects of the present disclosure provide techniques for late stage occlusion rendering in extended reality (XR) applications. Late stage occlusion rendering techniques described herein may be used to re-project depth information for real-world objects and virtual objects in a rendered image due to changed content of the real-world scene where the virtual objects are to be displayed as augmented objects in the real-world scene. In particular, with rendering latency, a real-world scene may change between a time when the real-world scene is first captured and used to render virtual objects, and when the rendered virtual objects are displayed as augmented objects in the real-world scene. For example, the real-world scene may be updated (e.g., between these two times) due to (1) a changing position of the wearable display device (e.g., due to head movement of a user of the wearable display device) and/or (2) one or more dynamic real-world objects in the real-world scene.

The re-projected real and virtual depths may be used to perform occlusion rendering when modifying the previously rendered image. In particular, re-projected real and virtual depths may be considered to ensure that portions of the virtual objects and/or the real-world objects are correctly occluded with respect to one another when modifying the rendered image. By occluding the image in this way, a realistic portrayal of the virtual objects and the real-world objects may be achieved, even in cases where there is high motion-to-render-to-photon (M2R2P) latency, such as in cases where split rendering techniques are used.

For example, an initial image, having both real-world objects and virtual objects, may be rendered for an XR application based on a position of a wearable display device. Such position information, however, is determined at some time interval before the image is rendered and displayed to a user of the wearable display device (e.g., due to latency in processing. network jitter, and/or network irregularities present when using split rendering). Accordingly, the position of the wearable display device may further change between when the position is initially determined, when the image is rendered, and further when the rendered image is displayed on a display of the wearable display device. Further, real-world objects in the real-world scene displayed by wearable display device may change between when the position is initially determined, when the image is render, and further when the rendered image is displayed on a display of the wearable display device. Therefore, after the image is rendered, and before the image is displayed on the wearable display device, re-projection and occlusion techniques may be applied.

Further, in certain aspects, warping may be applied to virtual objects (and/or real-world objects in mixed reality (MR) use cases) of the rendered image to change the virtual objects (and/or real-world) objects of the rendered image to be displayed in the wearable display device due to the changed position of the wearable display device. For example, re-projected depth information associated with the virtual objects (and/or re-projected depth information associated with the real-world objects in MR use cases) may be used to move the virtual objects (and/or the real-world objects) in the image to give parallax based on the updated position. Applying late stage re-projection, warping, and/or occlusion techniques to a rendered image, prior to displaying the image, may allow the rendered image to be modified based on changes to real-world scene between a time when the real-world scene is first captured and used to render virtual objects, and when the rendered virtual objects are displayed as augmented objects in the real-world scene (e.g., due to an updated position of the wearable display device and/or updated positions of real-world objects in the image).

As such, the techniques described herein may help to mitigate, or eliminate, image degradation caused by high M2R2P latency. In particular, the techniques described herein may be used to modify a rendered image such that virtual objects and/or real-world objects in a rendered image are correctly occluded to provide a more seamless interaction between such objects (e.g., eliminate gaps and/or collisions between virtual objects and/or real-world objects in a displayed image, as illustrated with respect to FIG. 5). More seamless interaction between virtual and real-world objects may provide a more immersive and real-world experience for a user of the wearable display device displaying the rendered image.

Figure 6:
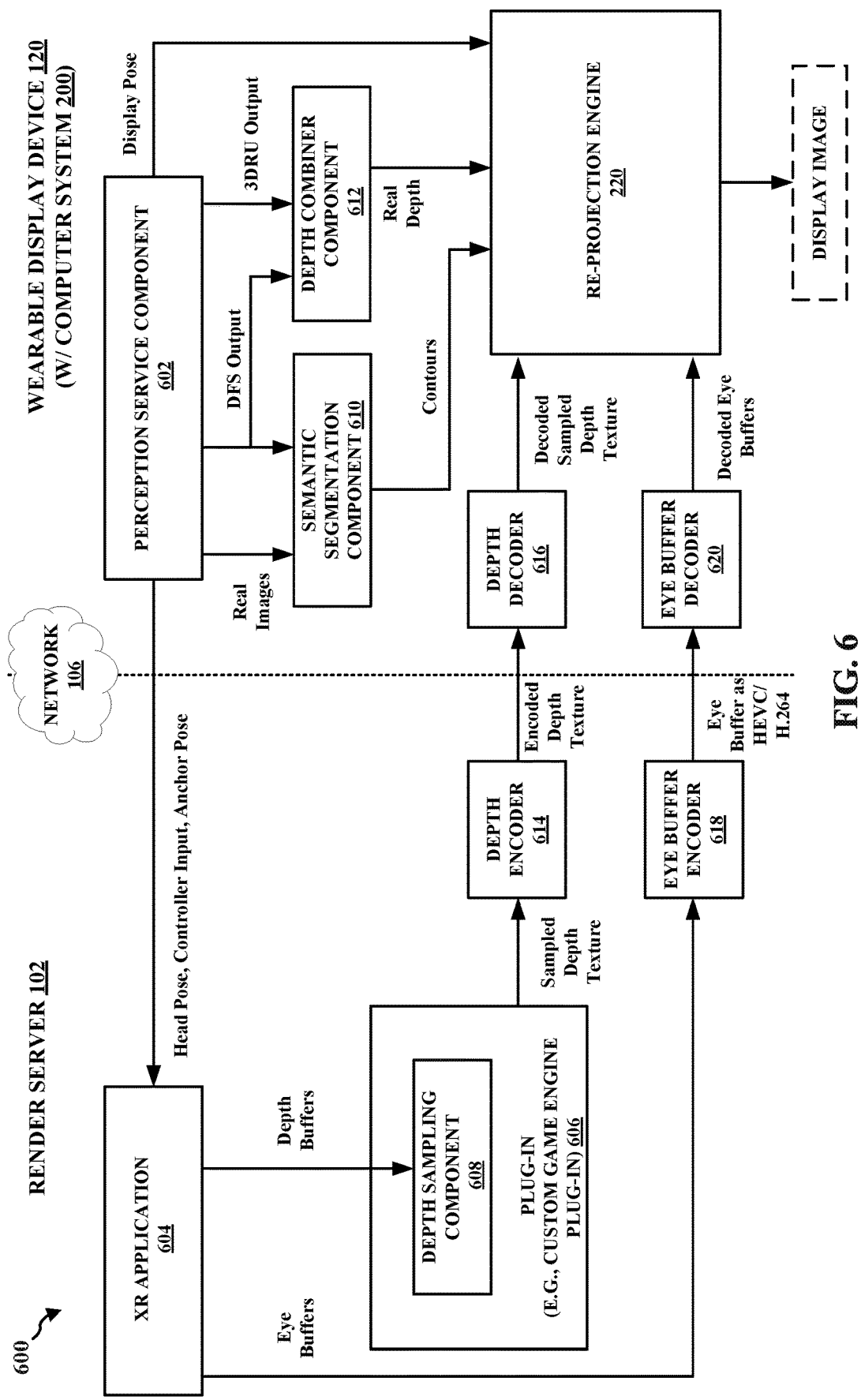
FIG. 6 is a conceptual diagram illustrating an example process for occlusion based rendering of real and virtual objects using depth map(s) and/or depth texture(s), in accordance with certain aspects of the present disclosure.

FIG. 6 is a conceptual diagram 600 illustrating an example process for occlusion based rendering of real and virtual objects using depth map(s) and/or depth texture(s), in accordance with certain aspects of the present disclosure.

As shown in FIG. 6, conceptual diagram 600 includes a server device (e.g., a smartphone, remote server, edge server, etc.), such as render server 102 illustrated in 2B, and an XR device, such as wearable display device 120 illustrated in FIGS. 1, 2A, and 2B, having a computer system, such as computer system 200, integrated therein. Wearable display device 120 is configured to communicate with render server 102 via a network 106 (e.g., for split rendering). Though computer system 200 is described in FIG. 6 as being integrated within wearable display device 120, in certain other embodiments, computer system 200 may be communicatively coupled with wearable display device 120.

Wearable display device 120 (e.g., computer system 200) includes a number of components, such as a perception service component 602, a semantic segmentation component 610, a depth combiner component 612, and a re-projection engine, such as re-projection engine 220 described with respect to FIGS. 2A and 2B. Similarly, render server 102 includes a number of components, such as an XR application 604 and a plug-in 606 (e.g., a custom game plug-in) having a depth sampling component 608.

Based on processing limitations of wearable display device 120 (e.g., an XR device), rendering operations are offloaded from wearable display device 120 to render server 102 that is connected to wearable display device 120 by network 106, as shown in FIG. 6. In particular, perception service component 602, on wearable display device 120, determines a position (e.g., pose) of wearable display device 120 and communicates, over network 106, this position to render server 102. Perception service component 602 may include a 6 DoF or 3 DoF pose tracker; thus, the position may include head pose information and/or anchor pose information. Anchors may be specific poses in the physical environment that may be tracked. In certain aspects, a controller is connected to either wearable display device 120 or render server 102 for additionally, or alternatively, providing controller input to render server 102.

Render server 102 executes an XR application 604 based on the position information (e.g., head pose input, controller input, and/or anchor pose input, etc.) received from perception service component 602 of wearable display device 120 and/or the controller to render virtual content in eye buffer(s) and/or generate depth buffer(s).

The eye buffer(s) comprise a virtual object (or more than one virtual object) based on the received position information and send the generated virtual object to an eye buffer encoder 618. Eye buffer encoder 618 on render server 102 encodes the eye buffers and sends the encoded eye buffers (e.g., encoded eye buffers as high efficiency video coding (HEVC)/H.264) to an eye buffer decoder 620 on wearable display device 120 via the wireless network (e.g., network 100.

The depth buffer(s) determine a depth value for each pixel of the virtual object generated (or each of the virtual objects generated) and stores these depth values in a depth texture or depth map. For example, the distance of each pixel of the virtual object from wearable display device (e.g., at the position provided to XR application 604) may be stored in the depth texture or the depth map. In certain aspects, this depth texture/depth map may be sent to depth sampling component 608 of plug-in 606. Plug-in 606 is a software component configured to perform particular function(s). Depth sampling component 608 is configured to provide a sampled depth texture/depth map to depth encoder 614. In certain aspects, depth sampling component 608 can help to reduce the depth buffer size. In particular, depth sampling component 608 may be used to sample the depth texture/depth map in order reduce transport bandwidth (e.g., to wearable display device 120). Depth sampling component 608 may be part of depth encoder 614 in certain aspects, or may be separate from depth encoder 614 in other aspects, as shown in FIG. 6. Depth encoder 614 on render server 102 encodes the depth texture/depth map and sends the encoded depth texture/depth map to a depth decoder 616 on wearable display device 120 via the wireless network (e.g., network 106).

In some cases, XR application 604 may not submit depth buffers, but as part of plug-in 606, the depth textures/depth maps may be determined from left and right stereo eye buffers.

Depth decoder 616 decodes the encoded depth texture/depth map, and provides the decoded depth texture/depth map to re-projection engine 220. Similarly, eye buffer decoder 620 decodes the encoded eye buffers and provides the decoded eye buffers to re-projection engine 220. The decoded eye buffers may be the rendered virtual objects or the rendered image.

In addition to perception service component 602 including a 6 DoF/3 DoF pose tracker, perception service component 602 may further include an image sensor, a three-dimensional (3D) reconstruction component, and/or a depth from stereo (DFS) component.

The image sensor is configured to continuously (or periodically) capture images of the real-world (e.g., real images) and provide these real images to semantic segmentation component 610. Semantic segmentation component 610 is configured to perform, in real-time, semantic segmentation, or image segmentation. Semantic segmentation is the process of clustering parts of an image together which belong to the same object class. Different instances of a same object class may be given a same label. For example, if there are two cats in a real image provided to semantic segmentation component 610, semantic segmentation component may give a same "car" label to all pixels, in the image, which correspond to each of the two different cats. Accordingly, semantic segmentation component 610 is a real-time semantic segmenter used to segment static and dynamic objects (e.g., referred to herein as real-world objects') in a real-world image to generate a segmentation map. Such segmentation may help to identify real-world objects of interest in the real image. More specifically, such segmentation may provide pixel level segments (also referred to herein as "contours") of real-world objects (e.g., person, foreground objects, etc.) of interest in the real image. Semantic segmentation component 610 provides these contours of the real-world objects to re-projection engine 220.

As mentioned, in certain aspects, wearable display device 120 may include camera(s) and/or other sensors to determine the gaze of a user (e.g., where a user is looking). This eye-tracking functionality may be used to identify, and subsequently segment, objects of interest or regions of interest in the real images. For example, real-world objects in portions of a real image where the eye is focused (e.g., within the fovea) may be identified as objects of interest and subsequently segmented, while real-world objects in portions of the real image where the eye is not focused (e.g., periphery) may not be segmented by semantic segmentation component 610.

Though aspects herein are described with respect to using semantic segmentation component 610, in certain other aspects, an instance segmentation component may be used instead to give a unique label to every instance of a particular object in a real image.

The DFS component (of perception service component 602) is configured to perform stereoscopic imaging. Stereoscopic imaging, is a technique used to enable a 3D effect, adding an illusion of depth to a flat image. In other words, stereoscopic imaging may use this illusion of depth to create a single 3D image, referred to as a stereo image. Stereo images may capture depth of both static and dynamic real-world objects; however, the depth information may not be reliable (e.g., due to noise).

The 3D reconstruction component (of perception service component 602) is configured to create a 3D mesh of a real-world scene by integrating several depth maps obtained from stereo images. While the 3D mesh, created by the 3D reconstruction component, may provide reliable information about the depth of static objects in the real-world (e.g., less noisy than depth maps created by the DFS component), the 3D reconstruction component may not capable of capturing depth information for dynamic objects.

Accordingly, in certain aspects (as shown in FIG. 6), a depth combiner component 612 is implemented to combine output from the DFS component and the 3D reconstruction component (e.g., shown as 3DRU in FIG. 6). Depth combiner component 612 is configured to combine depth maps from the 3D reconstruction component and stereo images from the DFS component to produce a cleaner, more reliable, and/or more detailed depth map for the real-world objects. Depth combiner component 612 provides the depth map for the real-world objects to re-projection engine 220.

Though aspects herein are described with respect to using depth combiner component 612 to combine output from a DES component and a 3D reconstruction component (of perception service component 602) to produce depth information for real-world objects, in certain other aspects, perception service component 602 may only include the DES component (e.g., may not have the 3D reconstruction component); thus, only stereo images from the DFS component may be used to create a depth map for the real-world objects (although such depth information in the depth map may be noisy).

Re-projection engine 220 may use as input, the decoded eye buffers (e.g., the rendered image), decoded depth information for the virtual object, contours of the real-world objects, and depth information (e.g., the depth map) for the real-world objects to graphically adjust the rendered image based on an updated position of wearable display device 120. The updated position may be referred to herein as the display pose, $P_D$, which represents a pose of wearable display device 120 when the image is to be displayed (e.g., after accounting for the M2R2P latency present in split rendering, as described above). In certain aspects, graphically adjusting the rendered image occurs immediately prior to displaying the adjusted, rendered image.

Figure 7:
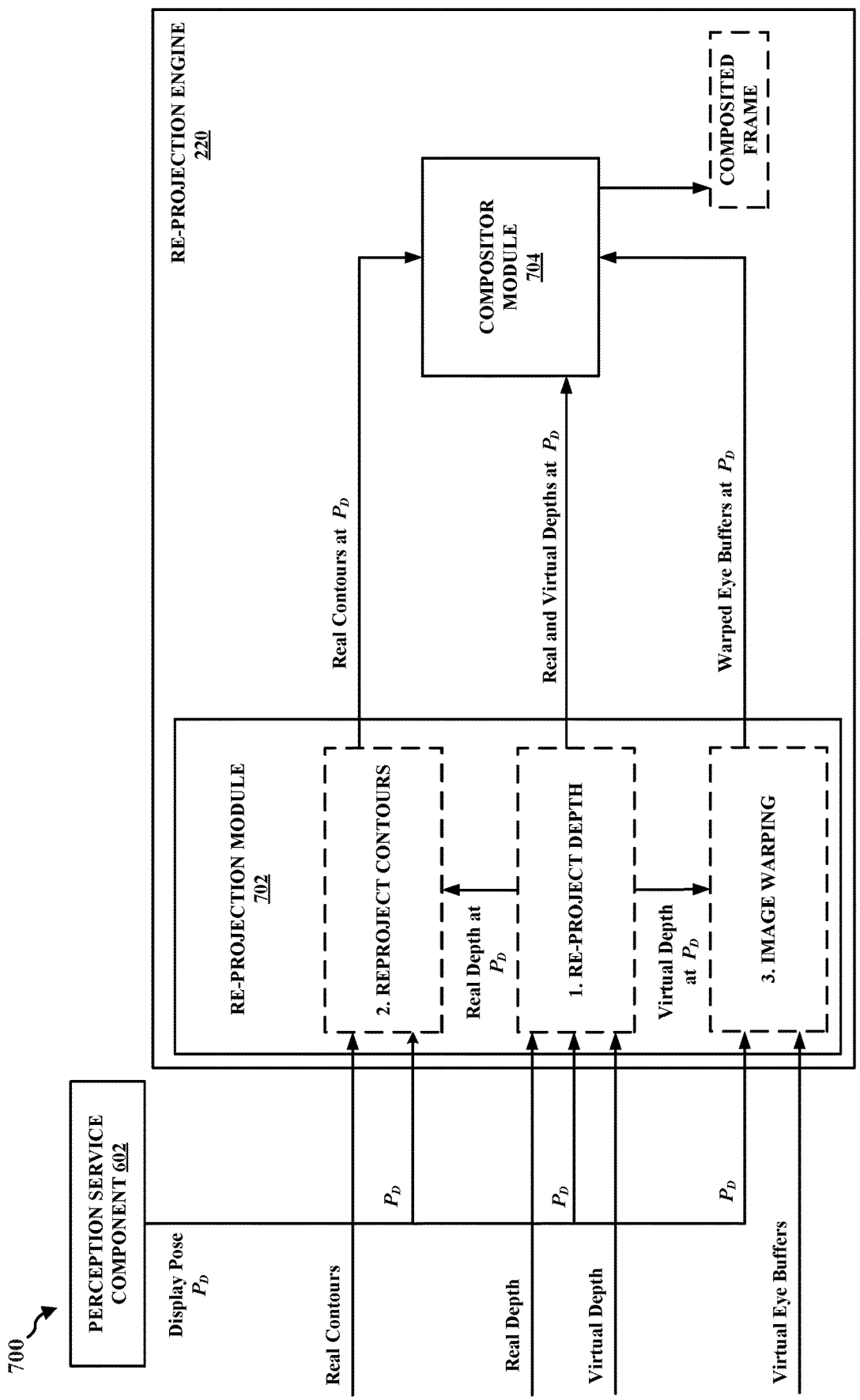
FIG. 7 is a conceptual diagram illustrating an example process for re-projection in occlusion-based rendering using depth map(s) and/or depth texture(s), in accordance with certain aspects of the present disclosure.

As described in more detail with respect to FIG. 7, graphically adjusting the rendered image may include (1) re-projecting contours of real-world objects based on the display pose, (2) updating depth information for the real-world objects based on the display pose, (3) updating depth information for the virtual objects based on the display pose, and (4) warping (e.g., time warping) the virtual objects based on the display pose. In certain aspects, as described with respect to FIG. 11, graphically adjusting the rendered image may further include (5) re-projecting contours of the virtual objects (e.g., where contours of the virtual objects are provided to re-projection engine 220). Re-projection engine 220 may use the re-projected contours of the real-world objects, the updated depth information for the real-world objects, the updated depth information for the virtual objects, the warped virtual objects, and/or the re-projected contours of the real-world objects to graphically adjust the rendered image for display at the display pose of wearable display device 120. A virtual object (e.g., a portion or all of the virtual object) may be hidden (e.g., occluded) in the graphically adjusted image by a real world object where updated depth information for the virtual object indicates that the virtual object is behind (e.g., further away than) a real-world object (e.g., based on the updated depth information for the real-world object) at the later stage position. A virtual object (e.g., a portion or all of the virtual object) may not be occluded in the rendered second where updated depth information for the virtual object indicates that the virtual object is in front of (e.g., closer than) a real-world object (e.g., based on the updated depth information for the real-world object) at the later stage position. The graphically adjusted image, having occluded real-world and virtual objects, may be displayed to a user of wearable display device 120.

FIG. 7 is a conceptual diagram 700 illustrating an example process for re-projection in occlusion-based rendering using depth map(s) and/or depth texture(s), in accordance with certain aspects of the present disclosure. The example process illustrated in FIG. 7 may occur at a re-projection engine, such as re-projection engine 220 illustrated in FIGS. 2A, 2B, and 6. The example process illustrated in FIG. 7 describes in more detail the operations described with respect to re-projection engine 220 in FIG. 6.

As shown in FIG. 7, re-projection engine 220, and more specifically, a re-projection module 702 of re-projection engine 220, receives, as input, contours of real-world objects from semantic segmentation component 610 illustrated in FIG. 6. Re-projection module 702 receives, as input, depth information (e.g., the depth map) for the real-world objects from depth combiner component 612 illustrated in FIG. 6. Re-projection module 702 receives, as input, decoded depth information for a virtual object (or multiple virtual objects) from depth decoder 616 illustrated in FIG. 6. Re-projection module 702 receives, as input, decoded eye buffers (e.g., the rendered image) from eye buffer decoder 620 illustrated in FIG. 6. Further re-projection module 702 receives, as input, the updated position of wearable display device 120 (e.g., display pose, $P_D$) from perception service component 602. The updated position (e.g., display pose, $P_D$) may be different than the position initially determined by perception service component 602, on wearable display device 120, and communicated to render server 102 for purposes of rendering virtual objects. The position may be different due to (1) a changing position of the wearable display device (e.g., due to head movement of a user of the wearable display device) and/or (2) one or more dynamic real-world objects moving in the real-world scene.

As a first step (labeled as 1 in FIG. 7), re-projection module 702 re-projects the received depth information. In particular, re-projection module 702 (1) updates depth information (e.g., depth maps/depth textures) for the real-world objects based on the display pose and (2) updates depth information (e.g., depth map/depth texture) for the virtual object based on the display pose. The depth information may need to be updated because the depth information provided to re-projection module 702 is representative of depth information for the real-world objects and the virtual object at the rendered pose (as opposed to the display pose).

As a second step (labeled as 2 in FIG. 7), re-projection module 702 re-projects the contours of the real-world objects. Re-projection module 702 performs the re-projection using the contours of the real-world objects, the display pose, and the updated depth information for the real-world objects (e.g., determined at the first step). Re-projection module 702 performs the re-projection using depth based re-projection.

As a third step (labeled as 3 in in FIG. 7), re-projection module 702 warps image content contained in the virtual eye buffers (e.g., warps the virtual object in the rendered image). Re-projection module 702 performs the warping using the virtual eye buffers, the display pose, and the updated depth information for the virtual object (e.g., determined at the first step).

Though FIG. 7 illustrates image warping occurring (e.g., at the third step) after re-projection of the contours of the real-world objects has occurred (e.g., at the second step), in certain aspects, the third step may be performed prior to the second step, and in certain other aspects, the second and third steps may be performed simultaneously.

An image to be displayed at a display of wearable display device 120 may be rendered based on (1) the updated depth information for the real-world objects and the virtual object (e.g., determined at the first step), (2) the re-projected contours for the real-world objects at the display pose, and (3) the warped eye buffers including the warped content (e.g., warped virtual object) at the display pose. A compositor module, such as compositor module 704 of re-projection engine 220 may be configured to render the image to be displayed at the display of wearable display device 120.

Compositor module 704 may compare the re-projected depth of the virtual object to the re-projected depths of the real-world objects to ensure that the virtual object and/or the real-world objects are correctly occluded with respect to one another when rendering the image for display. For example, the re-projected contours for the real-world objects may comprise a plurality of first pixels, and the warped eye buffers (e.g., virtual object) may comprise a plurality of second pixels. Compositor module 704 may determine which second pixels overlap which first pixels, and for these overlapping pixels, perform a depth comparison to determine how to accurately occlude the virtual object and/or the real-world objects. For example, where a second pixel of the warped eye buffers overlaps a first pixel of a real-world object, compositor module 704 may determine the updated depth of the second pixel and the updated depth of the first pixel. A smaller depth pixel may be used to render the image, given the pixel having the smaller depth is the pixel which is closer to wearable display device 120 at the display pose. Compositor module may perform this process for multiple pixels until the image is rendered. In other words, virtual objects are rendered without occlusion at render server 102 and sent to re-projection engine 220. Re-projection engine 220, and more specifically, re-projection module 702 and compositor module 704, may be configured to modify the rendered virtual object to account for occlusion at the display pose (e.g., at the update pose) of wearable display device 120.

In certain aspects, a real-world object which is captured in a rendered image is a moving object. Accordingly, to accurately adjust the rendered image based on the updated position of wearable display device 120 (e.g., for display at wearable display device 120), motion vectors (e.g., optical flow vectors) corresponding to the moving object may be determined and provided re-projection engine 220. For example, the motion vectors may be determined by comparing a current image (e.g., current frame, current rectangular image, etc.) to one or more past images (e.g., previous frame, previous rectangular image, etc.). In certain aspects, the images utilized to determine the motion vectors may be taken at different times (from the same lens, sensor, camera, etc.). The motion vectors may indicate an amount of movement between the images (e.g., current frame and previous frame). For example, the motion vector(s) may indicate a distance (in pixels, for instance) that an object has moved between the images. Additionally or alternatively, the motion vectors may be based on motion sensor (e.g., accelerometer) data. For example, the motion vectors may indicate an amount of movement (e.g., rotation, translation, etc.) of the real-world object of interest between images. The motion vectors may indicate a velocity (e.g., pixels per frame, inches per second, etc.) at which real-world object of interest is moving. Re-projection engine 220 may determine a location of the real-world object at the updated position based on the velocity, and more specifically, whether the real-object overlaps a virtual object at the updated position based on its determined location (e.g., for occlusion purposes). Further, re-projection engine 220 may use the motion vectors corresponding the real-world object to (1) update depth information for the real-world object (e.g., illustrated at the first step in FIG. 7) and (2) re-project contours the real-world object (e.g., illustrated at the second step in FIG. 7).

Figure 8:
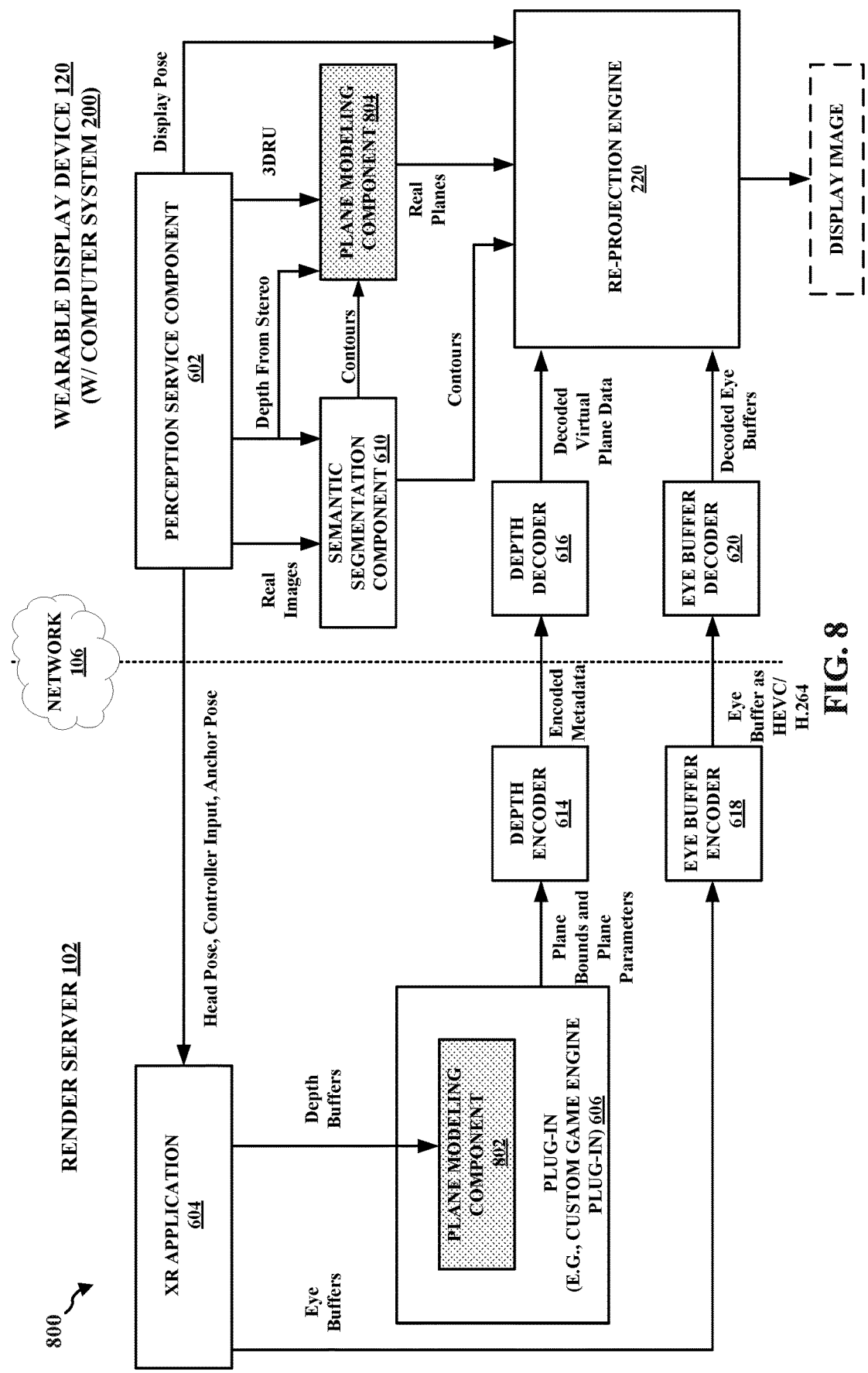
FIG. 8 is a conceptual diagram illustrating an example process for occlusion based rendering of real and virtual objects using approximated depth values, in accordance with certain aspects of the present disclosure.

FIG. 8 is a conceptual diagram 800 illustrating an example process for occlusion based rendering of real and virtual objects using approximated depth values, in accordance with certain aspects of the present disclosure. The example process illustrated in FIG. 8 is similar to the example process illustrated in FIG. 6. However, instead of using depth sampling component 608 in FIG. 6 to get depth maps/depth textures for virtual object(s), a plane modeling component 802, as shown in FIG. 8, may be used to generate 3D plane data for the virtual object(s), wherein the 3D plane data is a representation of the depth buffer data for the virtual object(s). For example, an entire visible surface of a virtual object may be approximated as a single plane in 3D space, i.e., using a plane parallel to the image plane of a rendering camera. By calculating an optimal (scene-dependent) depth as an approximation of various depths of the scene, complete depth information for the virtual object (e.g., depth map/depth texture for the virtual object) may not need to be transmitted to re-projection engine 220 on wearable display device 120. In other words, render server 102 may approximate depth of the virtual scenes with multiple planes to reduce bandwidth needed when sending such depth information to wearable display device 120, over network 106. Accordingly, there may be a tradeoff between bandwidth used and depth accuracy when using depth sampling component 608 illustrated in FIG. 6 or plane modeling component 802 illustrated in FIG. 8.

Further, as shown in FIG. 8, a plane modeling component 804 may be used in place of depth combiner component 612 illustrated in FIG. 6. In particular, instead of determining a depth map/depth texture for the real-world objects, the real-world objects may be modeled as one or more planes. Accordingly, depth information for the virtual object (or multiple virtual objects) and the real-world objects provided to re-projection engine 220 may be plane data (e.g., approximated depth information) as opposed to depth maps/depth textures for the virtual and real-world objects.

In some cases, XR application 604 may not submit depth buffers, but as part of plug-in 606, the plane data (e.g., approximated depth information) may be determined from left and right stereo eye buffers.

Figure 9:
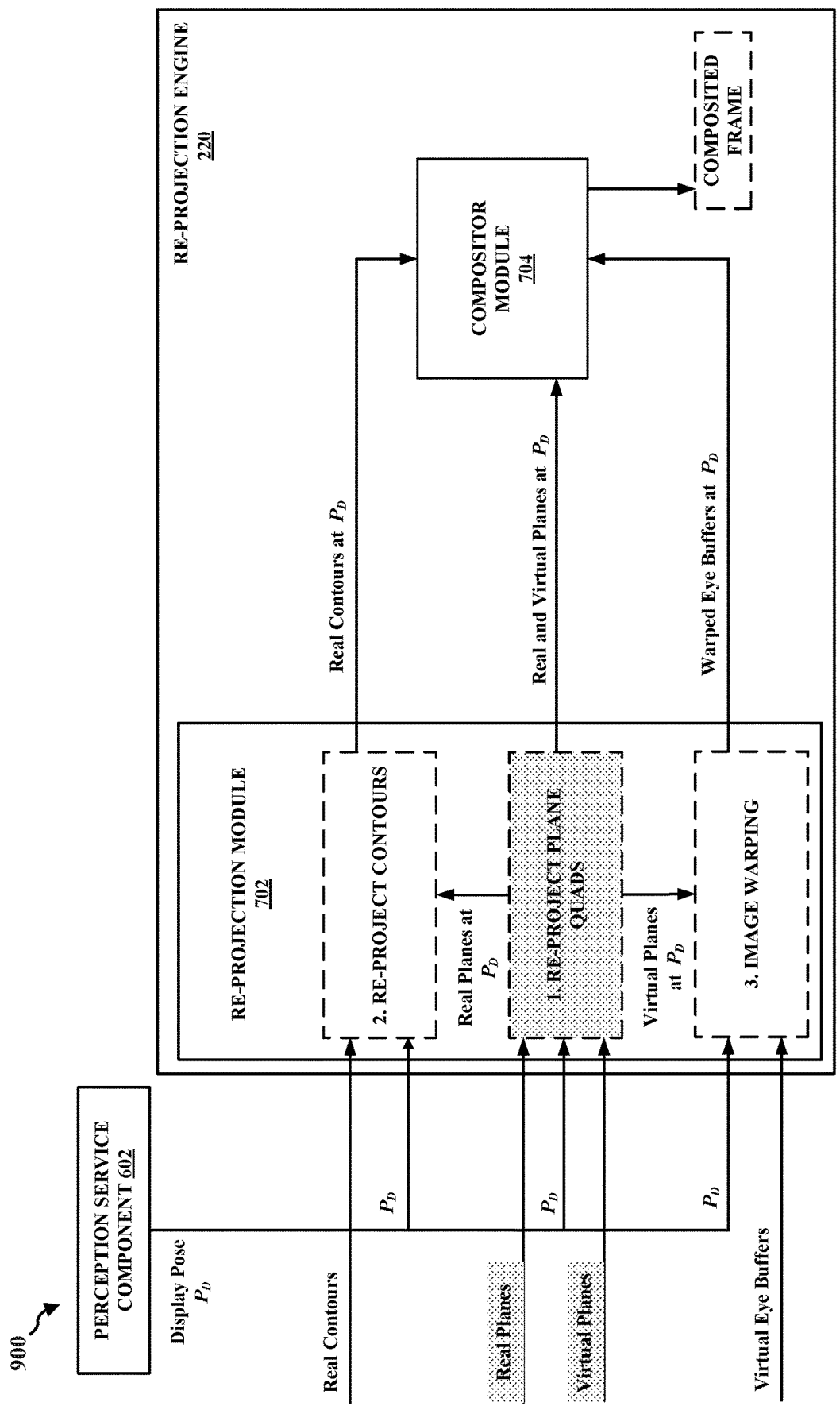
FIG. 9 is a conceptual diagram illustrating an example process for re-projection in occlusion-based rendering using approximated depth values, in accordance with certain aspects of the present disclosure.

FIG. 9 is a conceptual diagram 900 illustrating an example process for re-projection in occlusion-based rendering using approximated depth values, in accordance with certain aspects of the present disclosure. The example process illustrated in FIG. 9 is similar to the example process illustrated in FIG. 7. However, instead of re-projection engine receiving depth maps/depth textures for the virtual real-world objects, re-projection engine 220 receives planes (e.g., virtual and real planes) for the virtual and real-world objects. Accordingly, at the first step (labeled as 1 in FIG. 9), re-projection module 702 of re-projection engine 220 re-projects the received virtual and real planes, instead of information included in depth maps/depth textures corresponding to the virtual and real-world objects. Further, at the second step (labeled as 2 in FIG. 9), re-projection module 702 re-projects the contours of the real-world objects using the contours of the real-world objects, the display pose, and the re-projected for the real-world objects (e.g., determined at the first step). At the third step (labeled as 3 in FIG. 9) re-projection module 702 performs the re-projection using the virtual eye buffers, the display pose, and the re-projected plane for the virtual object (e.g., determined at the first step).

An image to be displayed at a display of wearable display device 120 may be rendered based on (1) the re-projected planes for the real-world objects and the virtual object (e.g., determined at the first step), (2) the re-projected contours for the real-world objects at the display pose, and (3) the warped eye buffers including the warped content (e.g., warped virtual object) at the display pose.

A compositor module, such as compositor module 704 of re-projection engine 220 may be configured to render the image to be displayed at the display of wearable display device 120. More specifically, compositor module 704 may compare the re-projected plane of the virtual object to the re-projected planes of the real-world objects to ensure that the virtual object and/or the real-world objects are correctly occluded with respect to one another when rendering the image for display.

In certain aspects, when rendering the image at the display pose, compositor module 704 does not draw pixels for area outside plane boundaries for the virtual object (e.g., real-world pixels may be shown instead). In certain aspects, when rendering the image at the display pose, compositor module 704 compositor module 704 does not draw pixels for area outside plane boundaries for the real-world objects (e.g., virtual object pixels may be shown instead), given the real-world objects may be background objects and/or objects that may not be of interest. In certain aspects, depth of pixels lying on the contours of the real-world objects may be obtained by ray-tracing onto the re-projected planes for the real-world objects approximated on the re-projected contours of the real-world objects at the display pose.

Figure 10:
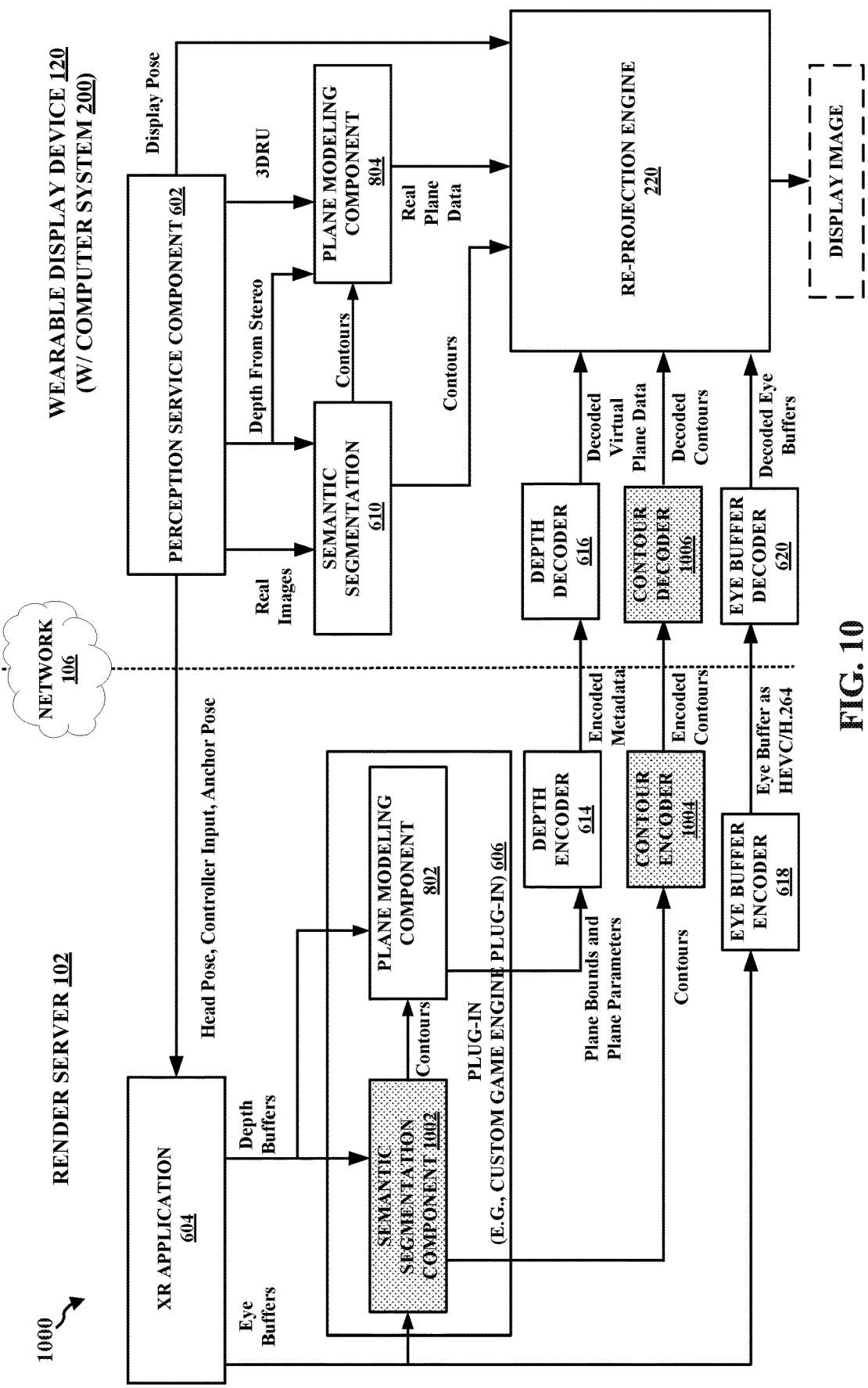
FIG. 10 is a conceptual diagram illustrating an example process for occlusion based rendering of real and virtual objects using approximated depth values and contours of the virtual objects, in accordance with certain aspects of the present disclosure.

FIG. 10 is a conceptual diagram 1000 illustrating an example process for occlusion based rendering of real and virtual objects using approximated depth values and contours of the virtual objects, in accordance with certain aspects of the present disclosure. The example process illustrated in FIG. 10 is similar to the example process illustrated in FIG. 8. However, in addition to the components listed in FIG. 8, in FIG. 10, a semantic segmentation component 1002 is added to render server 102. Similar to semantic segmentation component 610 on wearable display device 120, semantic segmentation component 1002 on render server 102 is configured to perform, in real-time, semantic segmentation, or image segmentation, to cluster parts of the virtual scene together which belong to the same object class. In other words, semantic segmentation component 1002 may be used to obtain segments (e.g., contours) of multiple virtual objects in the scene. Semantic segmentation performed by semantic segmentation component 1002 may be machine-learning (ML) based.

The introduction of semantic segmentation component 1002 on render server 102 may be used, for example, in cases where there are multiple virtual objects in the scene (e.g., virtual objects in the scene are not sparse). The contours of the multiple virtual objects, determined by semantic segmentation component 1002, may be sent to re-projection engine 220 such that re-projection engine may be able to perform occlusion with respect to virtual objects in the virtual scene when rendering the image at the display pose.

As an illustrative example, one virtual object may overlap another virtual object in an image rendered at render server 102. Accordingly, due to high M2R2P latency present in split rendering operations (e.g., illustrated in FIG. 10), when the rendered image is displayed at a display of wearable display device 120, gaps and/or collisions may result between the virtual objects themselves (and not just virtual objects and real-world objects). Thus, by obtaining the contours of multiple virtual objects in the virtual scene at render server 102, re-projection engine 122 may be configured to re-project the contours of the virtual objects and use the re-projected contours of the virtual objects to accurately occlude virtual objects, with respect to one another, in the image rendered for display.

As shown in FIG. 10, the contours of the virtual objects determined by semantic segmentation component 1002 may be sent to a contour encoder 1004 on render server 102. Contour encoder 1004 on render server 102 encodes the contours and sends the encoded contours to a contour decoder 1006 on wearable display device 120 via the wireless network (e.g., network 106). Contour decoder 1006 decodes the contours for the virtual objects and provides re-projection engine 220 with the decoded contours for the virtual objects, such that re-projection engine may accurately occlude the virtual objet s with respect to one another at the display pose.

Further, as shown in FIG. 10, the contours of the virtual objects determined by semantic segmentation component 1002 may also be provided to plane modeling component 802. Plane modeling component 802 may use the provided contours to determine plane bounds of the virtual objects define by the contours.

Figure 11:
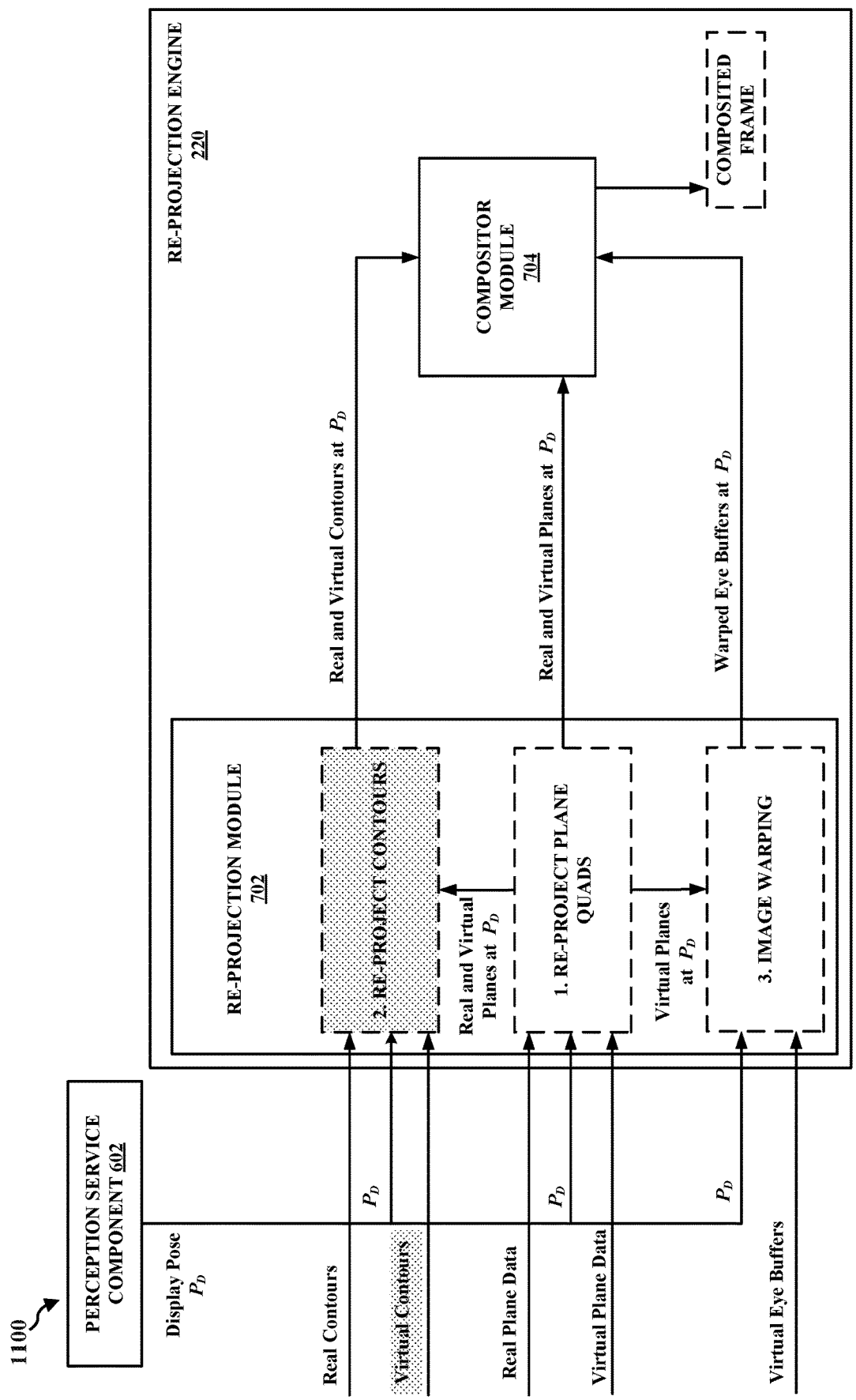
FIG. 11 is a conceptual diagram illustrating an example process for re-projection in occlusion-based rendering using approximated depth values and contours of virtual objects, in accordance with certain aspects of the present disclosure.

FIG. 11 is a conceptual diagram 1100 illustrating an example process for re-projection in occlusion-based rendering using approximated depth values and contours of virtual objects, in accordance with certain aspects of the present disclosure. The example process illustrated in FIG. 11 is similar to the example process illustrated in FIG. 9. However, instead of only receiving contours for the real-world objects, re-projection engine 220 receives contours for the virtual objects, as well. Thus, at the second step (labeled as 2 in FIG. 9), re-projection module 702 (1) re-projects the contours of the real-world objects using the contours of the real-world objects, the display pose, and the re-projected planes for the real-world objects (e.g., determined at the first step) and (2) re-projects the contours of the virtual objects using the contours of the virtual objects, the display pose, and the re-projected planes for the virtual objects (e.g., determined at the first step).

An image to be displayed at a display of wearable display device 120 may be rendered based on (1) the re-projected planes for the real-world objects and the virtual object (e.g., determined at the first step), (2) the re-projected contours for the real-world objects and the virtual objects at the display pose, and (3) the warped eye buffers including the warped content (e.g., warped virtual object) at the display pose.

Although not illustrated, in certain aspects, occlusion based rendering of real and virtual objects may be performed using depth map(s) and/or depth texture(s) (as opposed to approximated depth values) and contours of the virtual objects. In other words, semantic segmentation component 1002 introduced in FIG. 10 may similarly be introduced in FIG. 6 where depth maps/depth textures are used for occlusion-based rendering. Specifically, semantic segmentation component 1002, contour encoder 1004, and contour decoder 1006 may be added to conceptual diagram 600 to allow for the occlusion of virtual objects with other virtual objects (e.g., where multiple virtual objects are present in the virtual scene).

Re-projection engine 220 illustrated in FIGS. 7, 9, and 11 performs operations to render an image at a display pose optical see-through (OST) display technology (e.g., in AR use cases), which allows seeing the real world in full detail in places where no augmentation exists. Video see-through (VST) displays are able to provide an alternative to OST display technology by using live video, e.g., real images, to represent the real-world. VST displays may be used in MR use cases. Accordingly, in MR cases to account for high M2R2P latency when using split rendering, real images of the real-world (e.g., real-world objects) may need to be warped, in addition to the virtual objects rendered by render server 102.

Figure 12:
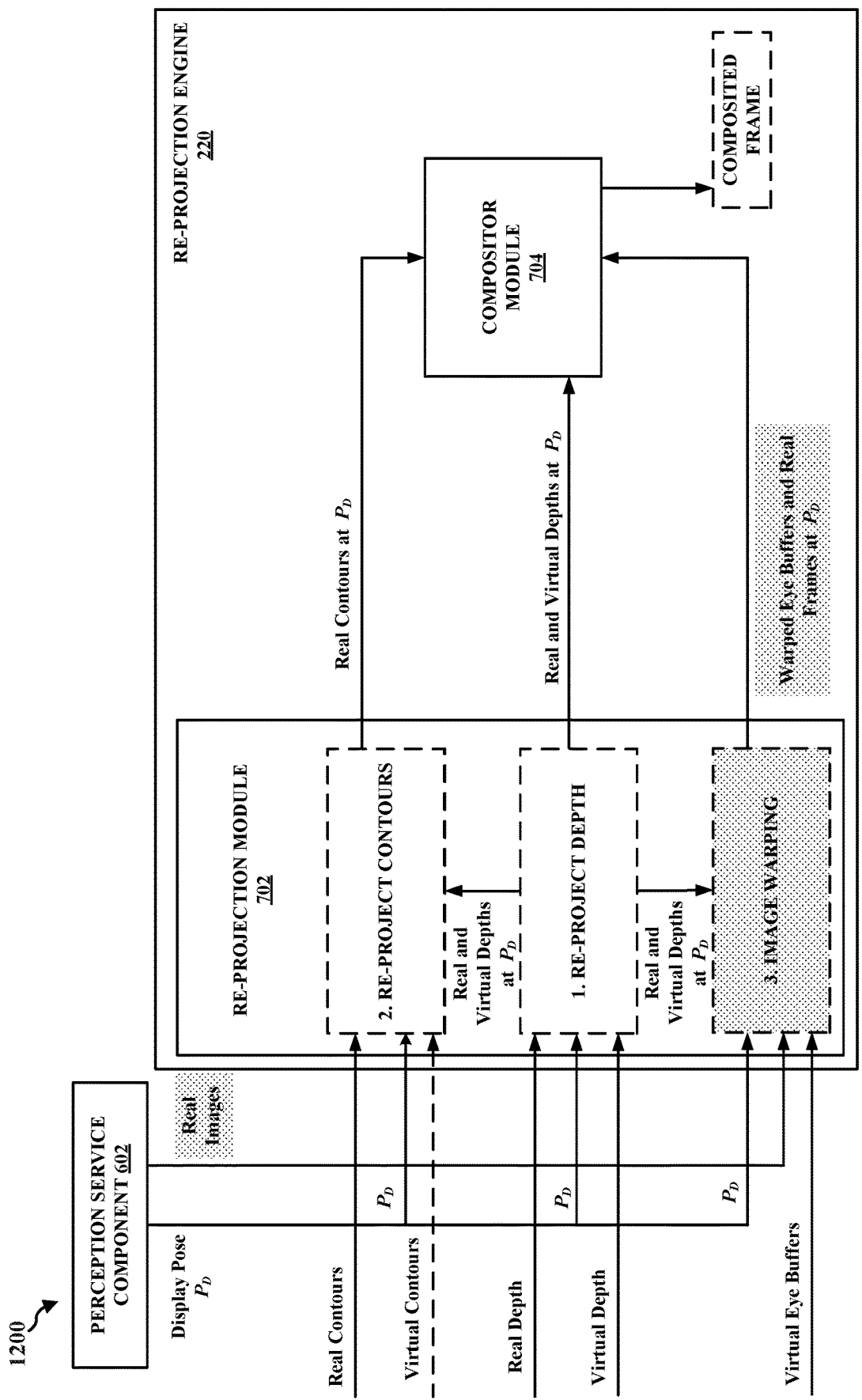
FIG. 12 is a conceptual diagram illustrating an example process for re-projection in occlusion-based rendering using depth map(s) and/or depth texture(s) for mixed reality (MR) applications, in accordance with certain aspects of the present disclosure.

FIG. 12 is a conceptual diagram 1200 illustrating an example process for re-projection in occlusion-based rendering using depth map(s) and/or depth texture(s) for MR applications, in accordance with certain aspects of the present disclosure. The example process illustrated in FIG. 12 is similar to the example process illustrated in FIG. 7. However, in addition to warping virtual eye buffers at the third step (labeled as 3 in FIG. 12), re-projection module 702 further warps image content contained in real images (e.g., real-world objects) received from perception service component 602. Re-projection module 702 performs the warping using the real images (e.g., real-world objects), the display pose, and the updated depth information for the real-world objects (e.g., determined at the first step). In certain aspects, the real-world objects provided to re-projection module 702 are rendered independently from the virtual objects (e.g., where both the real-world objects and the virtual objects are rendered prior to providing the objects to re-projection module 702). For example, the real-world objects may be rendered on computer system 200 integrated into and/or communicatively coupled with wearable display device 120, while the virtual objects may be rendered at render server 102.

In FIG. 12, both the warped eye buffers and the warped real-world objects are provided to compositor module 704 for occlusion based rendering. Compositor module 704 may select a real-world object pixel or a virtual object pixel to be displayed (e.g., where such pixels overlap) based on re-projected depths for each of these pixels. For virtual object pixels which do not overlap real-world object pixels, compositor module 704 may select the virtual object pixels to be displayed.

Figure 13:
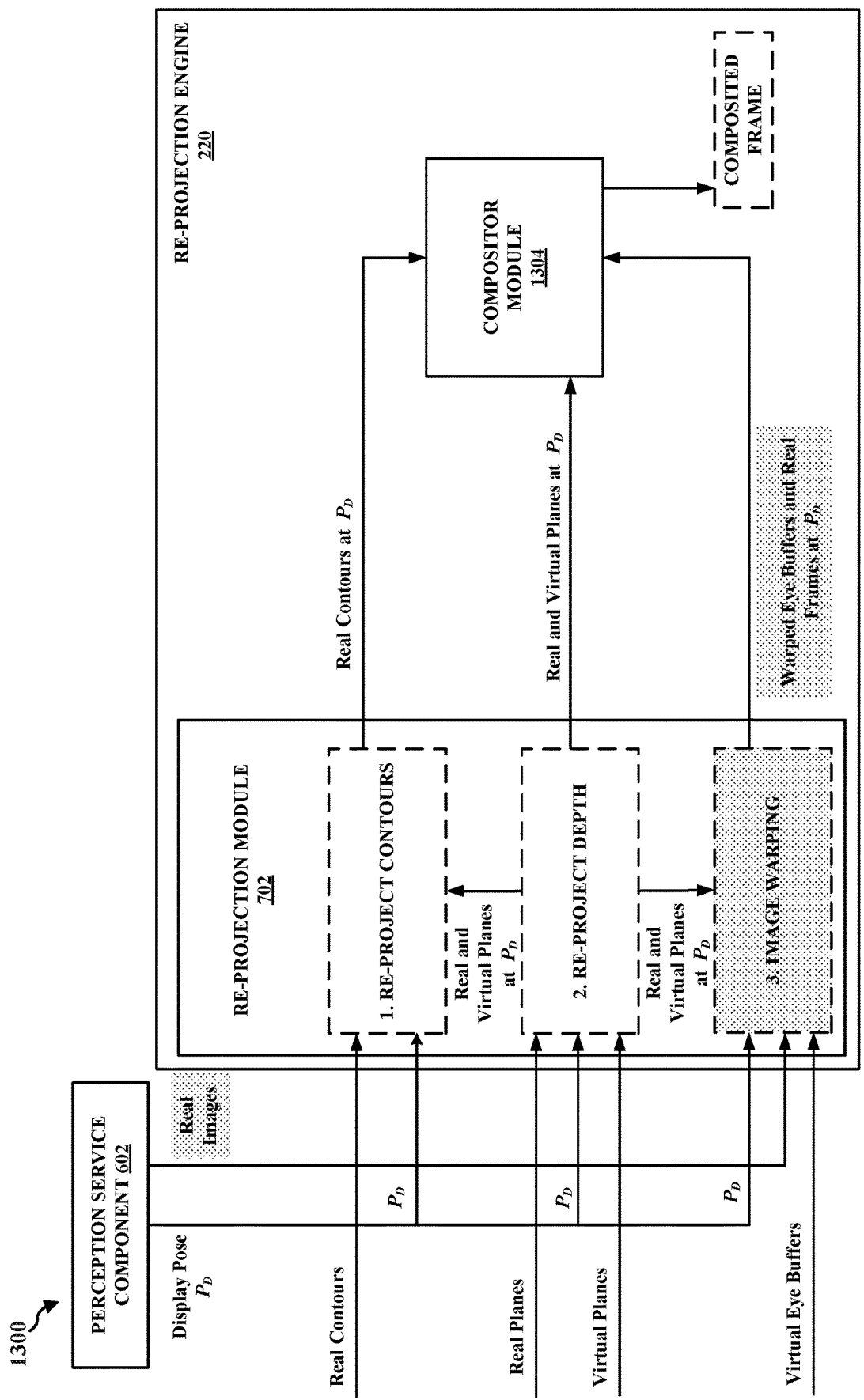
FIG. 13 is a conceptual diagram illustrating an example process for re-projection in occlusion-based rendering using approximated depth values for MR applications, in accordance with certain aspects of the present disclosure.

FIG. 13 is a conceptual diagram 1300 illustrating an example process for re-projection in occlusion-based rendering using approximated depth values for MR applications, in accordance with certain aspects of the present disclosure. The example process illustrated in FIG. 13 is similar to the example process illustrated in FIGS. 9 and 11. However, in addition to warping virtual eye buffers at the third step (labeled as 3 in FIG. 13), re-projection module 702 further warps image content contained in real images (e.g., real-world objects) received from perception service component 602. Re-projection module 702 performs the warping using the real images (e.g., real-world objects), the display pose, and the updated depth information for the real-world objects (e.g., determined at the first step).

In FIG. 13, both the warped eye buffers and the warped real-world objects are provided to compositor module 704 for occlusion based rendering. Compositor module 704 may select a real-world object pixel or a virtual object pixel to be displayed (e.g., where such pixels overlap) based on re-projected planes for each of these pixels. For virtual object pixels which do not overlap real-world object pixels, compositor module 704 may select the virtual object pixels to be displayed.

As mentioned, in certain aspects, wearable display device 120 may be operable to receive audio and/or gestural inputs from a user. Such gestural or audio inputs may be spoken voice commands or a recognized user gesture. Gestures may be received from one or more motion sensors and/or cameras integrated into and/or communicatively coupled with wearable display device 120 to allow the wearable display device to track one or more objects, such as a user's hand(s), and determine whether the object(s) has made a gesture. In certain aspects where wearable display device 120 is a VST display (e.g., in MR cases), gestures received from one or more motion sensors and/or cameras integrated into and/or communicatively coupled with wearable display device 120 may be used as input provided to a semantic segmentation component 610 (e.g., as described with respect to FIGS. 6, 8, and 10). In particular, a user may optionally select an object of interest (e.g., point to and/or pick an object of interest in the real-world using hand gestures), and this selection may be provided to semantic segmentation component 610. Semantic segmentation component 610 may treat these selected objects of interest as primary foreground objects. Semantic segmentation component 610 may segment the selected objects of interest in an image (e.g., using hand gestures), while other real-world objects in the image may not be segmented by semantic segmentation component 610 (and instead remain in the background/far plane).

Example Operations for Late Stage Occlusion Rendering

Figure 14:
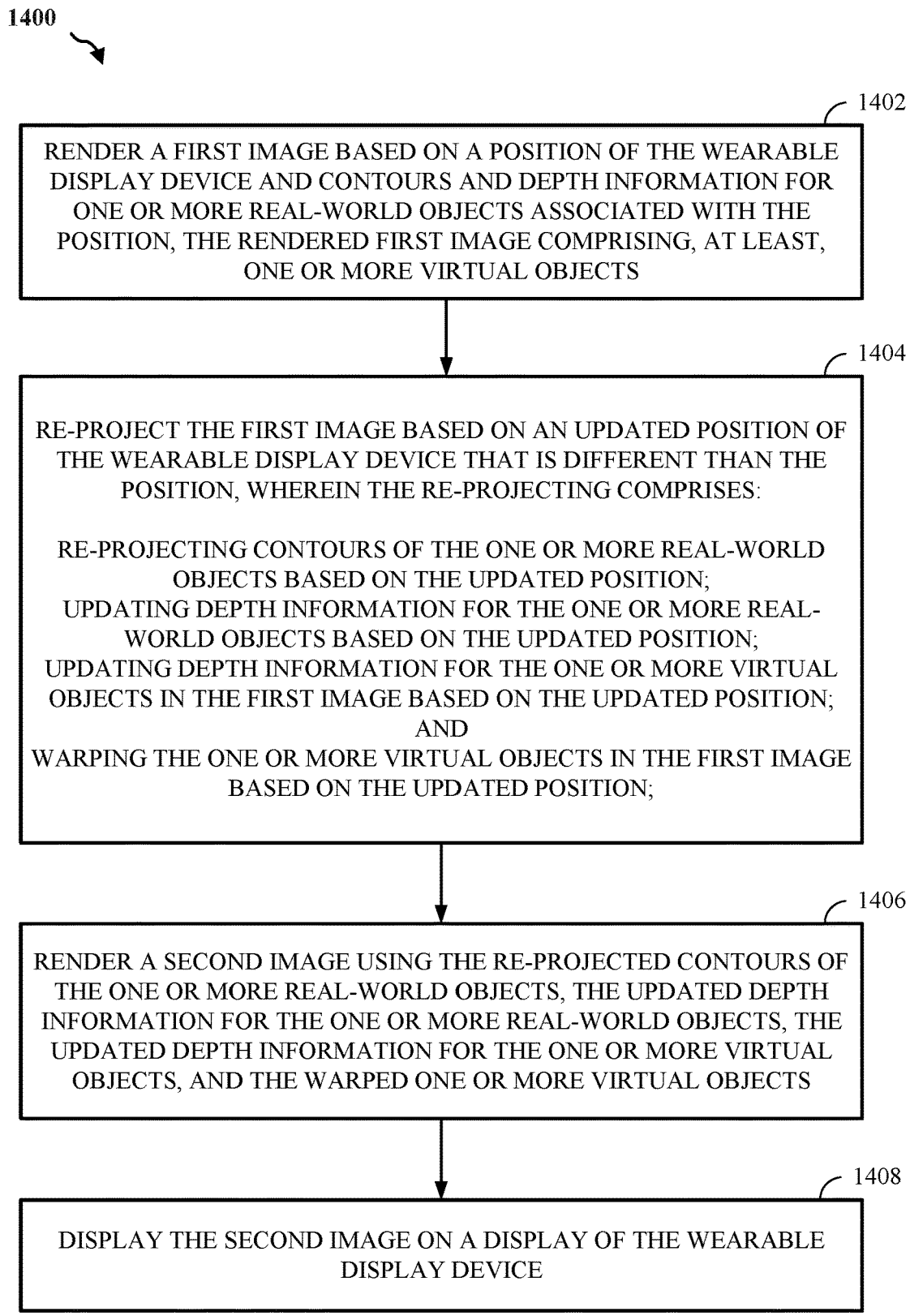
FIG. 14 is a flow diagram illustrating example operations for graphics processing at a wearable display device, in accordance with certain aspects of the present disclosure.

FIG. 14 is a flow diagram illustrating example operations 1400 for graphics processing, in accordance with certain aspects of the present disclosure. Operations 1400 may be performed, for example, by a computing system (e.g., computing system 200 illustrated in FIGS. 2A and 2B) integrated into and/or communicatively coupled with wearable display device (e.g., wearable display device 120 of FIGS. 1, 2A, and 2B).

Operations 1400 begin, at a first block 1402, by rendering a first image based on a position of the wearable display device and contours and depth information for one or more real-world objects associated with the position, the rendered first image comprising, at least, one or more virtual objects.

Operations 1400 continue, at a second block 1404, by re-projecting the first image based on an updated position of the wearable display device that is different than the position, wherein the re-projecting comprises: re-projecting contours of the one or more real-world objects based on the updated position; updating depth information for the one or more real-world objects based on the updated position; updating depth information for the one or more virtual objects in the first image based on the updated position; and warping the one or more virtual objects in the first image based on the updated position.

Operations 1400 continue, at a third block 1406, by rendering a second image using the re-projected contours of the one or more real-world objects, the updated depth information for the one or more real-world objects, the updated depth information for the one or more virtual objects, and the warped one or more virtual objects.

Operations 1400 continue, at a fourth block 1408, by displaying the second image on a display of the wearable display device. In certain aspects, rendering the second image at the third block 1406 occurs immediately prior, in time, to displaying the second image on the display of the wearable display device at the fourth block 1408.

Example Clauses

Implementation examples are described in the following numbered clauses:

Clause 1: A method of graphics processing at a wearable display device, the method comprising: rendering a first image based on a position of the wearable display device and contours and depth information for one or more real-world objects associated with the position, the rendered first image comprising, at least, one or more virtual objects; re-projecting the first image based on an updated position of the wearable display device that is different than the position, wherein the re-projecting comprises: re-projecting contours of the one or more real-world objects based on the updated position; updating depth information for the one or more real-world objects based on the updated position; updating depth information for the one or more virtual objects in the first image based on the updated position; and warping the one or more virtual objects in the first image based on the updated position; rendering a second image using the re-projected contours of the one or more real-world objects, the updated depth information for the one or more real-world objects, the updated depth information for the one or more virtual objects, and the warped one or more virtual objects; and displaying the second image on a display of the wearable display device.

Clause 2: The method of Clause 1, wherein: the re-projected contours for the one or more real-world objects comprise a plurality of first pixels; the warped one or more virtual objects comprise a plurality of second pixels; and rendering the second image using the re-projected contours for the one or more real-world objects, the updated depth information for the one or more real-world objects, the updated depth information for the one or more virtual objects, and the warped one or more virtual objects comprises: determining at least a portion of the second pixels overlap a portion of the first pixels; determining a depth of each pixel of the portion of the first pixels based on the updated depth information for the one or more virtual objects; determining a depth of each pixel of the portion of the second pixels based on the updated depth information for the one or more virtual objects; and for each pixel of the portion of the second pixels overlapping the portion of the first pixels, selecting a pixel to be rendered in the second image based on the depth of each pixel of the portion of the first pixels and the depth of each pixel of the portion of the second pixels.

Clause 3: The method of any one of Clauses 1 or 2, wherein re-projecting the contours of the one or more real-world objects is further based on the updated depth information for the one or more real-world objects.

Clause 4: The method of Clause 3, further comprising: computing motion vectors for at least one of the one or more real-world objects, wherein re-projecting the contours of the one or more real-world objects is further based on the motion vectors.

Clause 5: The method of any one of Clauses 1-4, wherein warping the one or more virtual objects in the first image is further based on the updated depth information for the one or more virtual objects in the first image.

Clause 6: The method of any one of Clauses 1-5, further comprising: capturing an image from a perspective of the wearable display device while the wearable display device is in the position; processing the image to determine: the contours of the one or more real-world objects in the image; and the depth information for the one or more real-world objects; receiving, from a server, the one or more virtual objects; and receiving, from the server, the depth information for the one or more virtual objects based on the position.

Clause 7: The method of Clause 6, wherein: the one or more real-world objects comprise static objects, dynamic objects, or a combination thereof; and processing the image to determine the contours of the one or more real-world objects in the image comprises running a semantic segmentation algorithm to identify the contours of the static objects, the dynamic objects, or the combination thereof.

Clause 8: The method of any one of Clauses 6 or 7, wherein the depth information for the one or more real-world objects comprises one or more of a three-dimensional (3D) reconstruction and understanding (3DRU) mesh or a depth from stereo (DFS) map.

Clause 9: The method of any one of Clauses 6-8, further comprising: transmitting, to the server, the position of the wearable display device; and receiving, from the server, the one or more virtual objects and the depth information for the one or more virtual objects in response to transmitting the position.

Clause 10: The method of Clause 9, further comprising: receiving, from the server, contours of the one or more virtual objects.

Clause 11: The method of Clause 10, wherein re-projecting the first image based on the updated position of the wearable display device that is different than the position further comprises: re-projecting contours of the one or more virtual objects based on the updated position, wherein the second image is rendered further using the re-projected contours of the one or more virtual objects.

Clause 12: The method of any one of Clauses 1-11, wherein the depth information for the one or more virtual objects comprises: a depth map, a depth texture, or one or more planes.

Clause 13: The method of any one of Clauses 1-12, wherein: the rendered first image further comprises the one or more real-world objects; and re-projecting the first image based on an updated position of the wearable display device that is different than the position further comprises warping the one or more real-world objects in the first image based on the updated position.

Clause 14: The method of Clause 13, wherein the second image is rendered further using the warped one or more real-world objects.

Clause 15: The method of any one of Clauses 1-14, further comprising: selecting the one or more real-world objects based on eye tracking data.

Clause 16: The method of any one of Clauses 1-15, wherein rendering the second image occurs immediately prior to displaying the second image on the display of the wearable display device.

Clause 17: An apparatus, comprising means for performing a method in accordance with any one of Clauses 1-16.

Clause 18: A non-transitory computer-readable medium comprising executable instructions that, when executed by a processor of an apparatus, cause the apparatus to perform a method in accordance with any one of Clauses 1-16.

Clause 19: A computer program product embodied on a computer-readable storage medium comprising code for performing a method in accordance with any one of Clauses 1-16.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of graphics processing at a wearable display device, the method comprising:
   receiving, from a render server:
      a first rendered image based on a first position of the wearable display device, the first rendered image comprising, at least, one or more virtual objects; and
      depth information associated with the one or more the virtual objects;
   obtaining depth information associated with one or more real-world objects;
   obtaining contour information associated with the one or more the real-world objects;
   obtaining information of an updated position of the wearable display device, the updated position being different than the first position;
   without displaying the first rendered image, rendering a second image based on re-projecting the first rendered image based on the updated position of the wearable display device, wherein the rendering the second image comprises:
      updating the depth information associated with the one or more real-world objects based on the updated position;

re-projecting the contour information associated with the one or more real-world objects based on the updated position and the updated depth information associated with the one or more real-world objects;
updating the depth information associated with the one or more virtual objects in the first rendered image based on the updated position;
warping the one or more virtual objects in the first rendered image based on the updated position and the updated depth information associated with the one or more virtual objects; and
rendering the second image based on the updated depth information associated with the one or more real-world objects, the re-projected contour information associated with the one or more real-world objects, the updated depth information associated with the one or more virtual objects, and the warped one or more virtual objects; and
displaying the second image on a display of the wearable display device.

2. The method of claim 1, wherein rendering the second image occurs immediately prior to displaying the second image on the display of the wearable display device.

3. The method of claim 1, wherein:
the re-projected contour information associated with the one or more real-world objects comprise a plurality of first pixels;
the warped one or more virtual objects comprise a plurality of second pixels; and
rendering the second image comprises:
determining at least a portion of the second pixels overlap a portion of the first pixels;
determining a depth of each pixel of the portion of the first pixels based on the updated depth information associated with the one or more virtual objects;
determining a depth of each pixel of the portion of the second pixels based on the updated depth information associated with the one or more virtual objects; and
for each pixel of the portion of the second pixels overlapping the portion of the first pixels, selecting a pixel to be rendered in the second image based on the depth of each pixel of the portion of the first pixels and the depth of each pixel of the portion of the second pixels.

4. The method of claim 1, wherein re-projecting the contour information associated with the one or more real-world objects is further based on the updated depth information associated with the one or more real-world objects.

5. The method of claim 4, further comprising computing motion vectors for at least one of the one or more real-world objects, wherein re-projecting the contour information associated with the one or more real-world objects is further based on the motion vectors.

6. The method of claim 1, wherein warping the one or more virtual objects in the first rendered image is further based on the updated depth information associated with the one or more virtual objects in the first rendered image.

7. The method of claim 1, further comprising:
capturing an image from a perspective of the wearable display device while the wearable display device is in the first position; and
processing the image to:
obtain the contour information associated with the one or more real-world objects in the image; and
obtain the depth information associated with the one or more real-world objects.

8. The method of claim 7, wherein:
the one or more real-world objects comprise static objects, dynamic objects, or a combination thereof; and
processing the image to obtain the contour information associated with the one or more real-world objects in the image comprises running a semantic segmentation algorithm to identify the contours of the static objects, the dynamic objects, or the combination thereof.

9. The method of claim 7, wherein the depth information associated with the one or more real-world objects comprises one or more of: a three-dimensional (3D) reconstruction and understanding (3DRU) mesh or a depth from stereo (DFS) map.

10. The method of claim 7, further comprising:
transmitting, to the render server, the first position of the wearable display device.

11. The method of claim 1, further comprising receiving, from the render server, contour information associated with the one or more virtual objects.

12. The method of claim 11, wherein re-projecting the first rendered image further comprises re-projecting the contour information associated with the one or more virtual objects based on the updated position, wherein rendering the second image is further based on the re-projected contour information associated with the one or more virtual objects.

13. The method of claim 1, wherein the depth information associated with the one or more virtual objects comprises:
a depth map;
a depth texture; or
one or more planes.

14. The method of claim 1, further comprising selecting the one or more real-world objects based on eye tracking data.

15. An apparatus configured for graphics processing, the apparatus comprising:
a memory comprising computer-executable instructions; and
one or more processors configured to, individually or collectively, execute the computer-executable instructions and cause the apparatus to:
receive, from a render server:
a first rendered image based on a first position of the wearable display device, the first rendered image comprising, at least, one or more virtual objects; and
depth information associated with the one or more the virtual objects;
obtain depth information associated with one or more real-world objects;
obtain contour information associated with the one or more the real-world objects;
obtain information of an updated position of the wearable display device, the updated position being different than the first position;
without displaying the first rendered image, render a second image based on re-projecting the first rendered image based on the updated position of the wearable display device, wherein the rendering the second image comprises:
updating the depth information associated with the one or more real-world objects based on the updated position;
re-projecting the contour information associated with the one or more real-world objects based on the updated position and the updated depth information associated with the one or more real-world objects;

updating the depth information associated with the one or more virtual objects in the first rendered image based on the updated position;

warping the one or more virtual objects in the first rendered image based on the updated position and the updated depth information associated with the one or more virtual objects; and rendering the second image based on the updated depth information associated with the one or more real-world objects, the re-projected contour information associated with the one or more real-world objects, the updated depth information associated with the one or more virtual objects, and the warped one or more virtual objects; and display the second image on a display of the wearable display device.

16. The apparatus of claim 15, wherein the one or more processors are configured to cause the apparatus to render the second image immediately prior to displaying the second image on the display of the wearable display device.

17. The apparatus of claim 15, wherein:
the re-projected contour information associated with the one or more real-world objects comprise a plurality of first pixels;
the warped one or more virtual objects comprise a plurality of second pixels; and
the one or more processors being configured to cause the apparatus to render the second image comprises the one or more processors being configured to cause the apparatus to:
determine at least a portion of the second pixels overlap a portion of the first pixels;
determine a depth of each pixel of the portion of the first pixels based on the updated depth information associated with the one or more virtual objects;
determine a depth of each pixel of the portion of the second pixels based on the updated depth information associated with the one or more virtual objects; and
for each pixel of the portion of the second pixels overlapping the portion of the first pixels, select a pixel to be rendered in the second image based on the depth of each pixel of the portion of the first pixels and the depth of each pixel of the portion of the second pixels.

18. The apparatus of claim 15, wherein the one or more processors are configured to cause the apparatus to re-project contour information associated with the one or more real-world objects further based on the updated depth information associated with the one or more real-world objects.

19. The apparatus of claim 18, wherein the one or more processors are configured to cause the apparatus further to compute motion vectors for at least one of the one or more real-world objects, wherein re-projecting the contour information associated with the one or more real-world objects is further based on the motion vectors.

20. The apparatus of claim 15, wherein the one or more processors are configured to cause the apparatus to warp the one or more virtual objects in the first rendered image further based on the updated depth information associated with the one or more virtual objects in the first rendered image.

21. The apparatus of claim 15, wherein the one or more processors are configured to cause the apparatus further to:
capture an image from a perspective of the wearable display device while the wearable display device is in the first position; and
process the image to:
obtain the contour information associated with the one or more real-world objects in the image; and
obtain the depth information associated with the one or more real-world objects.

22. The apparatus of claim 21, wherein:
the one or more real-world objects comprise static objects, dynamic objects, or a combination thereof; and
the one or more processors are configured to cause the apparatus to process the image to obtain the contour information associated with the one or more real-world objects in the image comprises running a semantic segmentation algorithm to identify the contours of the static objects, the dynamic objects, or the combination thereof.

23. The apparatus of claim 21, wherein the depth information for the one or more real-world objects comprises one or more of: a three-dimensional (3D) reconstruction and understanding (3DRU) mesh or a depth from stereo (DFS) map.

24. The apparatus of claim 21, wherein the one or more processors are configured to cause the apparatus further to:
transmit, to the render server, the first position of the wearable display device.

25. The apparatus of claim 15, wherein the one or more processors are configured to execute the computer-executable instructions and cause the apparatus further to receive, from the render server, contour information associated with the one or more virtual objects.

26. The apparatus of claim 25, wherein the one or more processors being configured to cause the apparatus to re-project the first rendered image comprises the one or more processors being configured to cause the apparatus further to re-project the contour information associated with the one or more virtual objects based on the updated position, and wherein rendering the second image is further based on the re-projected contour information associated with the one or more virtual objects.

27. An apparatus for graphics processing, the apparatus comprising:
means for receiving, from a render server:
a first rendered image based on a first position of the wearable display device, the first rendered image comprising, at least, one or more virtual objects; and
depth information associated with the one or more the virtual objects;
means for obtaining depth information associated with one or more real-world objects;
means for obtaining contour information associated with the one or more the real-world objects;
means for obtaining information of an updated position of the wearable display device, the updated position being different than the first position;
means for, without displaying the first rendered image, rendering a second image based on re-projecting the first rendered image based on the updated position of the wearable display device, wherein the means for rendering the second image comprises:
means for updating the depth information associated with the one or more real-world objects based on the updated position;
means for re-projecting the contour information associated with the one or more real-world objects based on the updated position and the updated depth information associated with the one or more real-world objects;

means for updating the depth information associated with the one or more virtual objects in the first rendered image based on the updated position;

means for warping the one or more virtual objects in the first rendered image based on the updated position and the updated depth information associated with the one or more virtual objects; and means for rendering the second image based on the updated depth information associated with the one or more real-world objects, the re-projected contour information associated with the one or more real-world objects, the updated depth information associated with the one or more virtual objects, and the warped one or more virtual objects; and means for displaying the second image on a display of the wearable display device.

28. A non-transitory computer-readable medium comprising computer-executable instructions that, when executed by a processor of a wearable display device, cause the wearable display device to perform a method of graphics processing, the method comprising:

receiving, from a render server:
- a first rendered image based on a first position of the wearable display device, the first rendered image comprising, at least, one or more virtual objects; and
- depth information associated with the one or more the virtual objects;

obtaining depth information associated with one or more real-world objects;

obtaining contour information associated with the one or more the real-world objects;

obtaining information of an updated position of the wearable display device, the updated position being different than the first position;

without displaying the first rendered image, render a second image based on re-projecting the first rendered image based on the updated position of the wearable display device, wherein the rendering the second image comprises:

updating the depth information associated with the one or more real-world objects based on the updated position;

re-projecting the contour information of the one or more real-world objects based on the updated position and the updated depth information associated with the one or more real-world objects;

updating the depth information associated with the one or more virtual objects in the first rendered image based on the updated position;

warping the one or more virtual objects in the first rendered image based on the updated position and the updated depth information for the one or more virtual objects; and rendering the second image based on the updated depth information associated with the one or more real-world objects, the re-projected contour information associated with the one or more real-world objects, the updated depth information associated with the one or more virtual objects, and the warped one or more virtual objects; and displaying the second image on a display of the wearable display device.

* * * * *